US012626019B2

(12) United States Patent
Sharma et al.

(10) Patent No.: US 12,626,019 B2
(45) Date of Patent: May 12, 2026

(54) SYSTEMS AND METHODS FOR APPLYING SECRECY SETTINGS ON A USER DEVICE

(71) Applicant: Samsung Electronics Co., Ltd., Suwon-si (KR)

(72) Inventors: Ajay Sharma, Kurukshetra (IN); Arihant Jain, Noida (IN); Prakhar Shrivastav, Kanpur (IN); Rahul Yadav, Alwar (IN); Vipul Gupta, Hisar (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 43 days.

(21) Appl. No.: 18/800,655

(22) Filed: Aug. 12, 2024

(65) Prior Publication Data

US 2024/0403490 A1    Dec. 5, 2024

Related U.S. Application Data

(63) Continuation of application No. PCT/KR2023/002099, filed on Feb. 14, 2023.

(30) Foreign Application Priority Data

Feb. 14, 2022    (IN) ............................. 202211007796
May 10, 2022    (IN) ............................. 2022 11007796

(51) Int. Cl.
G06F 21/00         (2013.01)
G06F 11/34         (2006.01)
G06F 21/62         (2013.01)

(52) U.S. Cl.
CPC ...... G06F 21/6263 (2013.01); G06F 11/3438 (2013.01)

(58) Field of Classification Search
CPC ............. G06F 21/6263; G06F 11/3438; G06F 21/554; G06F 21/316; G06N 3/02;
(Continued)

(56) References Cited

U.S. PATENT DOCUMENTS 8,766,934 B2     7/2014  Jeong et al.
10,439,966 B2    10/2019  Feuz et al.
(Continued)

FOREIGN PATENT DOCUMENTS

CN    103795847 A    5/2014
CN    104360875 A    2/2015
(Continued)

OTHER PUBLICATIONS

US 10,089,491 B2, 10/2018, Kong et al. (withdrawn)
(Continued)

*Primary Examiner* — Mahfuzur Rahman
(74) *Attorney, Agent, or Firm* — Jefferson IP Law, LLP

(57) ABSTRACT

A method of applying secrecy settings on a user device is provided. The method includes monitoring, by the user device, user activity data based on usage of one or more applications of the user device, determining, by the user device, whether a user is exhibiting a secretive behavior based on the user activity data and historical behavior of the user, extracting, by the user device, contextual information from other applications, determining, by the user device, whether the contextual information is related to the user activity data, processing, by the user device based on the secretive behavior, the contextual information to provide at least one data stream and at least one attribute associated with the contextual information, determining, by the user device, a predefined secrecy type based on an analysis of the at least one data stream and the at least one attribute, and applying, by the user device, secrecy settings on the user device based on the predefined secrecy type.

17 Claims, 23 Drawing Sheets

(58) Field of Classification Search
CPC ...... G06N 3/0442; G06N 3/0464; G06N 3/08;
G06N 20/00; G06N 20/20; G06Q 10/10;
G06Q 50/01
See application file for complete search history.

(56) References Cited

U.S. PATENT DOCUMENTS

| | | | |
|---|---|---|---|
| 10,817,791 B1 | 10/2020 | Shoemaker et al. | |
| 11,704,439 B2 | 7/2023 | Bonat et al. | |
| 2008/0051072 A1 | 2/2008 | Kraft et al. | |
| 2011/0276396 A1* | 11/2011 | Rathod | H04L 51/214 |
| | | | 707/706 |
| 2013/0268357 A1* | 10/2013 | Heath | G06Q 10/10 |
| | | | 726/26 |
| 2014/0129942 A1* | 5/2014 | Rathod | H04N 21/44226 |
| | | | 715/720 |
| 2015/0089666 A1* | 3/2015 | Lee | G06F 21/6245 |
| | | | 726/27 |
| 2018/0025164 A1 | 1/2018 | Plastina | |
| 2018/0232534 A1 | 8/2018 | Dotan-Cohen et al. | |
| 2019/0080113 A1 | 3/2019 | Kim et al. | |
| 2019/0138940 A1 | 5/2019 | Feuz et al. | |
| 2020/0380171 A1 | 12/2020 | Bonat et al. | |
| 2020/0394709 A1* | 12/2020 | Cella | G06F 18/23 |
| 2021/0124840 A1* | 4/2021 | Dotan-Cohen | H04W 12/033 |
| 2021/0169417 A1* | 6/2021 | Burton | A61B 5/4857 |
| 2021/0342836 A1* | 11/2021 | Cella | G06Q 30/0208 |
| 2022/0187847 A1* | 6/2022 | Cella | G05B 19/41885 |
| 2022/0197306 A1* | 6/2022 | Cella | G06Q 10/06311 |
| 2022/0198562 A1* | 6/2022 | Cella | G06Q 40/04 |
| 2022/0366494 A1* | 11/2022 | Cella | H04L 9/3231 |
| 2023/0123322 A1* | 4/2023 | Cella | G05B 23/0283 |
| | | | 700/29 |
| 2023/0222454 A1* | 7/2023 | Cella | G06Q 10/06315 |
| | | | 705/28 |
| 2025/0054008 A1* | 2/2025 | Cella | G06N 5/043 |
| 2025/0266043 A1* | 8/2025 | Maizels | G10L 25/84 |
| 2025/0279100 A1* | 9/2025 | Maizels | G06V 40/20 |

FOREIGN PATENT DOCUMENTS

| | | | |
|---|---|---|---|
| KR | 10-1455027 B1 | 11/2014 | |
| KR | 10-1692550 B1 | 1/2017 | |
| KR | 10-2524070 B1 | 4/2023 | |
| WO | 2017/219558 A1 | 12/2017 | |

OTHER PUBLICATIONS

Indian Office Action dated Mar. 4, 2025, issued in Indian Application No. 202211007796.
Extended European Search Report dated Oct. 25, 2024, issued in European Application No. 23753253.6-1218.
Kywe et al., PrivateDroid: Private Browsing Mode for Android, Sep. 2014.
Kingpin, 7 Disadvantages of incognito mode, Kingpin Private Browser, Nov. 2019.
Weetech Solution, 6 Disadvantages of Incognito Mode and Is it Safe to Use?, Weetech Solution Private Limited, Aug. 2021.
Stratus Point IT, The Limitations of Private Browsing, Stratus Point IT a Computer Support Service, Aug. 2020.
Samsungy, Samsung Internet Browser | Latest Version 16.2, Samsung Community, Mar. 2022.
International Search Report dated May 17, 2023, issued in International Patent Application No. PCT/KR2023/002099.

* cited by examiner

Input                                                                Output

Input                                                                          Output

Downloaded image is
not visible in gallery

File details are not
visible in notification

File open in
Browser Itself

Downloads are visible
only in secret mode's
Download History

FIG. 14B

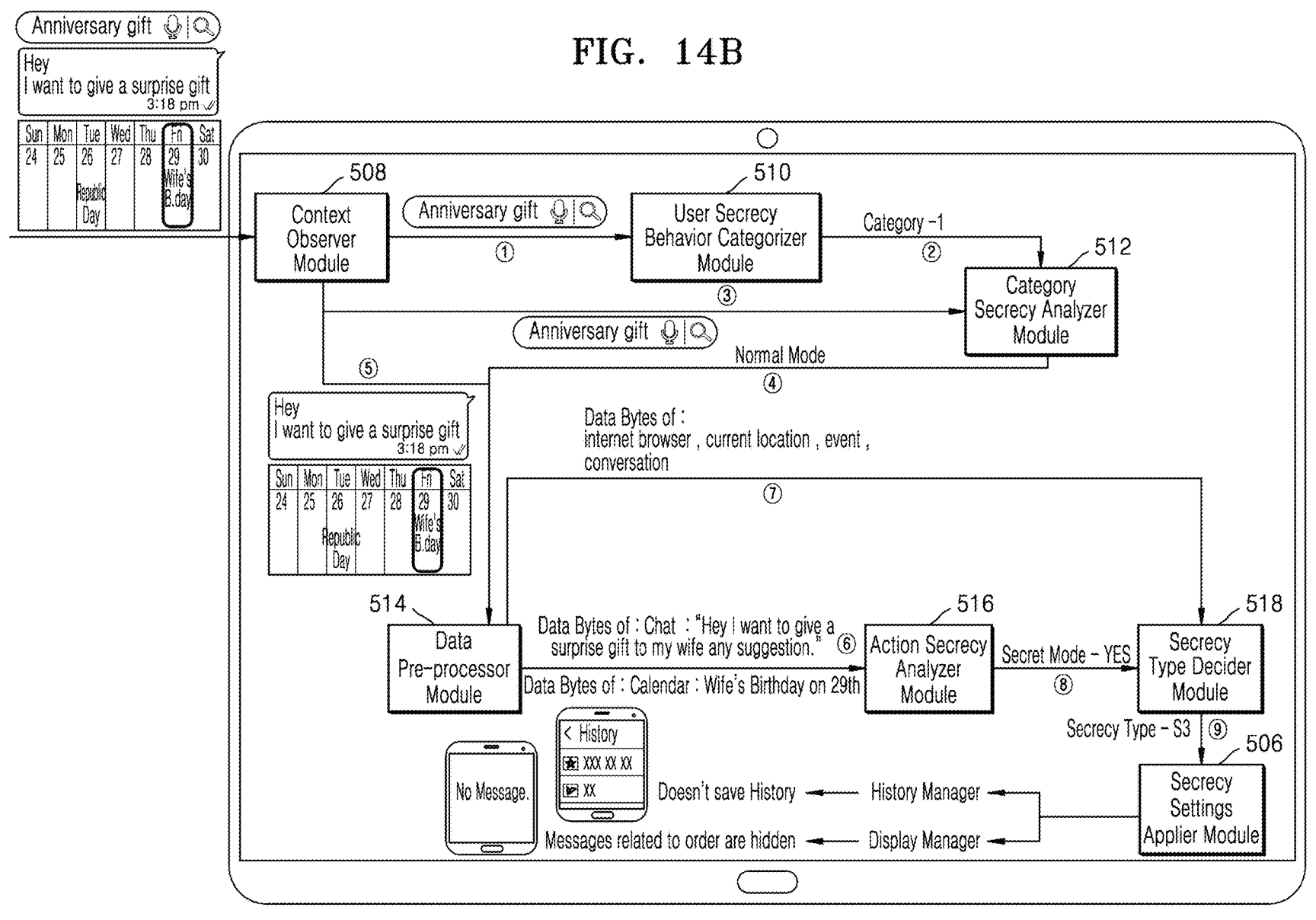

Anniversary gift

Hey
I want to give a surprise gift    3:18 pm ✓

| Sun | Mon | Tue | Wed | Thu | Fri | Sat |
|---|---|---|---|---|---|---|
| 24 | 25 | 26 | 27 | 28 | 29 | 30 |
| | | Republic Day | | | Wife's B.day | |

508 — Context Observer Module

510 — User Secrecy Behavior Categorizer Module

512 — Category Secrecy Analyzer Module

① Anniversary gift

② Category –1

③

④ Normal Mode

Anniversary gift

Hey
I want to give a surprise gift    3:18 pm ✓

| Sun | Mon | Tue | Wed | Thu | Fri | Sat |
|---|---|---|---|---|---|---|
| 24 | 25 | 26 | 27 | 28 | 29 | 30 |
| | | Republic Day | | | Wife's B.day | |

⑤

514 — Data Pre-processor Module

Data Bytes of :
internet browser , current location , event , conversation

Data Bytes of : Chat : "Hey I want to give a surprise gift to my wife any suggestion."    ⑥

Data Bytes of : Calendar : Wife's Birthday on 29th

⑦

516 — Action Secrecy Analyzer Module

⑧ Secret Mode – YES

518 — Secrecy Type Decider Module

Secrecy Type – S3    ⑨

506 — Secrecy Settings Applier Module

History Manager → Doesn't save History

Display Manager → Messages related to order are hidden

< History

⊠ xxx xx xx

⊠ xx

No Message.

FIG. 16A

Scenario: User went to a party last night and now he is downloading the party photos.

Related Art

| 10:00 AM | 12:00 PM | 12:02 PM |
|---|---|---|
| User's friend sent him photos of party last night | User Saved/Downloaded them | His pictures are visible in gallery |

Pictures — Today — 25 Jan

Download / Share / Delete

Present Disclosure

| 10:00 AM | 12:00 PM | 12:02 PM |
|---|---|---|
| User's friend sent him photos of party last night | Application automatically switched to secret mode | Image not visible gallery and can only be seen in application (browser) |

Pictures — 25 Jan

Download / Share / Delete

SYSTEMS AND METHODS FOR APPLYING SECRECY SETTINGS ON A USER DEVICE

CROSS-REFERENCE TO RELATED APPLICATION(S)

This application is a continuation application, claiming priority under § 65 (c), of an International application No. PCT/KR2023/002099, filed on Feb. 14, 2023, which is based on and claims the benefit of an Indian Provisional patent application No. 202211007796, filed on Feb. 14, 2022, in the Indian Intellectual Property Office, and of an Indian Complete patent application No. 202211007796, filed on May 10, 2022, in the Indian Intellectual Property Office, the disclosure of each of which is incorporated by reference herein in its entirety.

BACKGROUND

1. Field

The disclosure relates to providing secure device usage. More particularly, the disclosure relates to enhance safe device usage experience for the user where the user can browse and download from the internet in an intelligent way based on an automatic switching to incognito/secret mode using a machine learning model.

2. Description of Related Art

Browsing a website or using any network application on users' phones can lead to leakage of data in various ways. Users usually either forget to enable a hidden/incognito mode or mostly do not have any control over this leak.

There are multiple ways in which user's data is leaked and user-experience/privacy is hampered. For example, in case of data leak to the network, the user may be spammed with related advertisements. Specifically, the current problem is that when user searches/browses something (e.g., flight tickets), the data is leaked to the network applications/websites. This data is later used to spam the user and later, the user starts receiving related advertisements. Thus, the user experience is hampered.

Further, the user's data may be leaked to other users. The various applications may maintain usage history, and such history data may be leaked to other users. Specifically, the current problem is that when a user performs some browsing/search action, the applications may maintain its history. While the user who searched may not want other people to know the search history, the other users may get to know about this history.

Additionally, the user's data may be leaked to other applications. The content is visible to all the applications that are able to open it. Specifically, the downloaded content may be visible to the user who is using it and also to all applications which are able to open such content even if it is private.

While there are some current mechanisms to avoid such data leakages, but such mechanisms are mostly based on manual settings to avoid data leakages. With machine learning advancements, the technology may be leveraged to automate such data leakages.

Accordingly, there is a need to address the above challenges to provide an intelligent mechanism for safeguarding user's search/browsing history and to prevent leakage of data to other users, network, and applications.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a system and method for applying secrecy settings on a user device.

Additional aspects will be set forth in part in the description which follows and, in part, will be apparent from the description, or may be learned by practice of the presented embodiments.

In accordance with an aspect of the disclosure, a method of applying secrecy settings on a user device is provided. The method includes monitoring, by the user device, user activity data based on usage of one or more applications of the user device, determining, by the user device via a neural network model, whether a user is exhibiting a secretive behavior based on the user activity data and historical behavior of the user, extracting, by the user device, contextual information from other applications, wherein the contextual information is associated with the user activity data, determining, by the user device, whether the contextual information is related to the user activity data, in response to determining that the contextual information is related to the user activity data, processing, by the user device based on the secretive behavior, the contextual information to provide at least one data stream and at least one attribute associated with the contextual information, in response to determining to process the user activity data according to one of a plurality of predefined secrecy types, determining, by the user device, a predefined secrecy type from among the plurality of predefined secrecy types based on an analysis of the at least one data stream and the at least one attribute, and applying, by the user device, secrecy settings on the user device based on the predefined secrecy type.

In accordance with another aspect of the disclosure, a system for applying secrecy settings on an electronic device is provided. The system includes a secret mode behavior detector module configured to monitor user activity data based on usage of one or more applications of the user device and determine, via a neural network model, whether the user is exhibiting a secretive behavior based on the user activity data and historical behavior of the user. The system further includes an action analyzer module configured to extract contextual information from other applications, wherein the contextual information is associated with the user activity data, determine whether the contextual information is related to the user activity data, in response to determining that the contextual information is related to the user activity data, process, based on the secretive behavior, the contextual information to provide at least one data stream and at least one attribute associated with the contextual information, and in response to determining to process the user activity data according to one of a plurality of predefined secrecy types, determine a predefined secrecy type from among the plurality of predefined secrecy types based on the analysis of the at least one data stream and the at least one attribute. The system further includes a secrecy settings applier module configured to apply secrecy settings on the user device based on the predefined secrecy type.

In accordance with another aspect of the disclosure, an electronic device for applying secrecy settings is provided. The electronic device includes memory storing one or more computer programs, and one or more processors communicatively coupled to the memory. The one or more computer programs include computer-executable instructions that, when executed by the one or more processors, cause the electronic device to monitor user activity data based on usage of one or more applications of the electronic device, determine, via a neural network model, whether a user is exhibiting a secretive behavior based on the user activity data and historical behavior of the user, extract contextual information from other applications, wherein the contextual information is associated with the user activity data, determine whether the contextual information is related to the user activity data, in response to determining that the contextual information is related to the user activity data, process, based on the secretive behavior, the contextual information to provide at least one data stream and at least one attribute associated with the contextual information, in response to determining to process the user activity data according to one of a plurality of predefined secrecy types, determine a predefined secrecy type from among the plurality of predefined secrecy types based on an analysis of the at least one data stream and the at least one attribute, and apply secrecy settings on the electronic device based on the predefined secrecy type.

In accordance with another aspect of the disclosure, one or more non-transitory computer-readable storage media storing one or more computer programs including computer-executable instructions that, when executed by one or more processors of a user device, cause the user device to perform operations are provided. The operations include monitoring, by the user device, user activity data based on usage of one or more applications of the user device, determining, by the user device via a neural network model, whether a user is exhibiting a secretive behavior based on the user activity data and historical behavior of the user, extracting, by the user device, contextual information from other applications, wherein the contextual information is associated with the user activity data, determining, by the user device, whether the contextual information is related to the user activity data, in response to determining that the contextual information is related to the user activity data, processing, by the user device based on the secretive behavior, the contextual information to provide at least one data stream and at least one attribute associated with the contextual information, in response to determining to process the user activity data according to one of a plurality of predefined secrecy types, determining, by the user device, a predefined secrecy type from among the plurality of predefined secrecy types based on an analysis of the at least one data stream and the at least one attribute, and applying, by the user device, secrecy settings on the user device based on the predefined secrecy type.

Other aspects, advantages, and salient features of the disclosure, will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIGS. 14A and 14B illustrate a use case scenario for a user who is trying to buy surprise gift for his wife, while keeping it as a surprise, according to various embodiments of the disclosure;

FIGS. 16A and 16B illustrate a use case scenario for a user who went to a party last night and now he is downloading the party photos, according to various embodiments of the disclosure;

FIG. 19 illustrates a random forest to analyze a user action and determine secrecy type by a secrecy type decider module, according to an embodiment of the disclosure.

Throughout the drawings, like reference numerals will be understood to refer to like parts, components, and structures.

DETAIL DESCRIPTION

Figure 1:
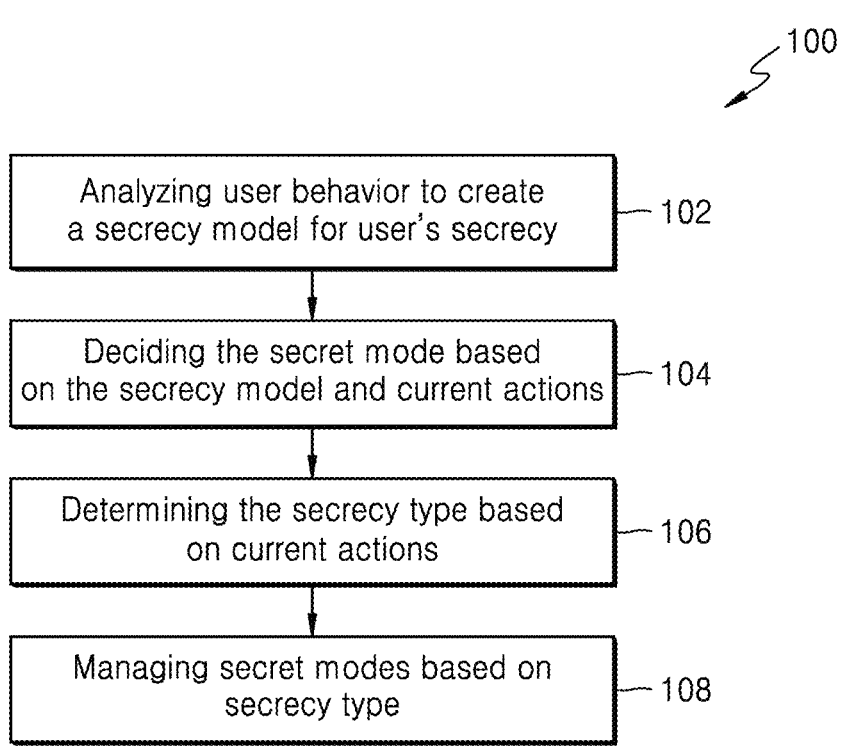
FIG. 1 illustrates a process flow depicting a method for secret modes invocation to apply secrecy settings on an electronic device, according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It will be understood by those skilled in the art that the foregoing general description and the following detailed description are explanatory of the disclosure and are not intended to be restrictive thereof.

Reference throughout this specification to "an aspect," "another aspect," or similar language means that a particular feature, structure, or characteristic described in connection with the embodiment is included in at least one embodiment of the disclosure. Thus, appearances of the phrase "in an embodiment," "in another embodiment," and similar language throughout this specification may, but do not necessarily, all refer to the same embodiment.

The terms "comprises," "comprising," or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components.

The disclosure is directed towards enhancing safe device usage experience for the user using a machine learning (ML) model. The user may browse and download from the internet in an intelligent way where the ML model enables an automatic switching to incognito/secret mode based on behavioral learning of the user. This intelligent framework decides a type of data privacy that needs to be applied for each of a plurality of user activities in a user personalized manner.

In one embodiment, the required secrecy type may be of different types and may be invoked based on behavioral learning of the user. As depicted, when it is analyzed that the current data does not need any protection, then no secrecy may be invoked. Further, in case of required secrecy from network, the data leak to network/websites is prevented. In such a scenario of secrecy from network, the cookies may be blocked, and anti-tracking may be switched ON. Further, the display may not be changed, downloads may be performed in public mode, and browsing history may be saved.

Further, upon analysis of secrecy requirement from other users/applications, cookies may be allowed. In this mode, the anti-tracking may be switched ON, display may be changed, downloads may be performed in private mode, and history may not be saved.

The key solutions provided to the aforementioned problems include: a) creating an artificial intelligence (AI) engine (based on user's past behavior/content type) to detect what type of data/actions needs to be protected from leakage; b) analyzing the current actions of the user along with the other contextual data to find out if the current action/data needs to be protected from leakage; and c) creating an AI/ML based random forest consisting of multiple decision trees where each decision tree is trained with a particular contextual information (events, conversations, search pattern, etc.) to find out the optimum secrecy type. Based on secrecy type, selective secret settings are applied (e.g., content open in secret/incognito mode) wherein the display of the applications might be changed dynamically, downloaded content will be managed accordingly (in secret mode which have no access to normal user other than the main user) etc.

It should be appreciated that the blocks in each flowchart and combinations of the flowcharts may be performed by one or more computer programs which include instructions. The entirety of the one or more computer programs may be stored in a single memory or the one or more computer programs may be divided with different portions stored in different multiple memories.

Any of the functions or operations described herein can be processed by one processor or a combination of processors. The one processor or the combination of processors is circuitry performing processing and includes circuitry like an application processor (AP, e.g. a central processing unit (CPU)), a communication processor (CP, e.g., a modem), a graphics processing unit (GPU), a neural processing unit (NPU) (e.g., an artificial intelligence (AI) chip), a Wi-Fi chip, a Bluetooth® chip, a global positioning system (GPS) chip, a near field communication (NFC) chip, connectivity chips, a sensor controller, a touch controller, a finger-print sensor controller, a display drive integrated circuit (IC), an audio CODEC chip, a universal serial bus (USB) controller, a camera controller, an image processing IC, a microprocessor unit (MPU), a system on chip (SoC), an integrated circuit (IC), or the like.

FIG. 1 illustrates a process flow depicting a method for secret modes invocation to apply secrecy settings on an electronic device, according to an embodiment of the disclosure.

Referring to FIG. 1, a method 100 includes, at operation 102, analyzing user behavior to create a secrecy model for user's secrecy. The created model may be a neural network based machine learning model which may be configured to automatically determine a secrecy type and associated settings to be applied on an electronic device for safeguarding user privacy, while using the user device. This is further explained in conjunction with at least FIG. 3 of the disclosure.

At operation 104, the method 100 includes deciding the secrecy mode based on the secrecy model and current actions. The secrecy mode may include one of a secret or normal mode based on the current user actions/activity and historical data of user behavior. This is further explained in detail in conjunction with at least FIG. 2 of the disclosure.

At operation 106, the method 100 includes determining the secrecy type based on current actions of the user. The secrecy type may correspond to one of a plurality of predefined secrecy types, each of which may include a set of settings to be applied on the user device. The set of settings may be associated with, but not limited to, downloads, cookies, history, display, and tracking associated with user activity. This is further explained in detail in conjunction with at least FIG. 2 of the disclosure.

At operation 108, the method 100 includes managing secret modes based on secrecy types. In various embodiment, the various secret modes based on secrecy types may include, but not limited to, no secret mode applied, managing the downloads, managing content to be displayed on a display of the user device, controlling the history of user actions, preventing user actions from being tracked and managing browser cookies. This is further explained in detail in conjunction with at least FIG. 2 of the disclosure.

Figure 2:
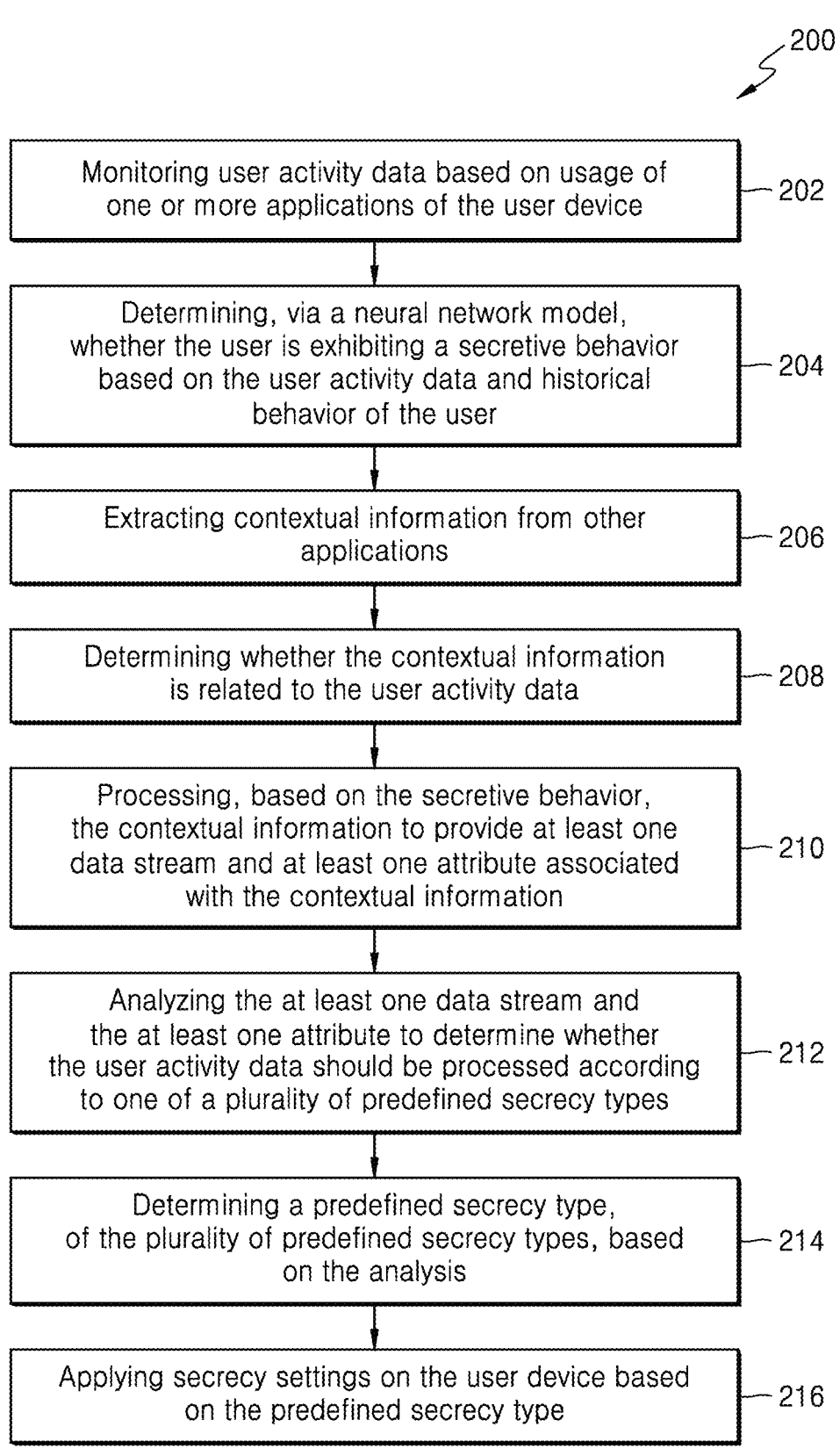
FIG. 2 illustrates a process flow depicting a method for applying secrecy settings on an electronic device, according to an embodiment of the disclosure.

FIG. 2 illustrates a process flow depicting a method for applying secrecy settings on an electronic device, according to an embodiment of the disclosure.

Figure 3:
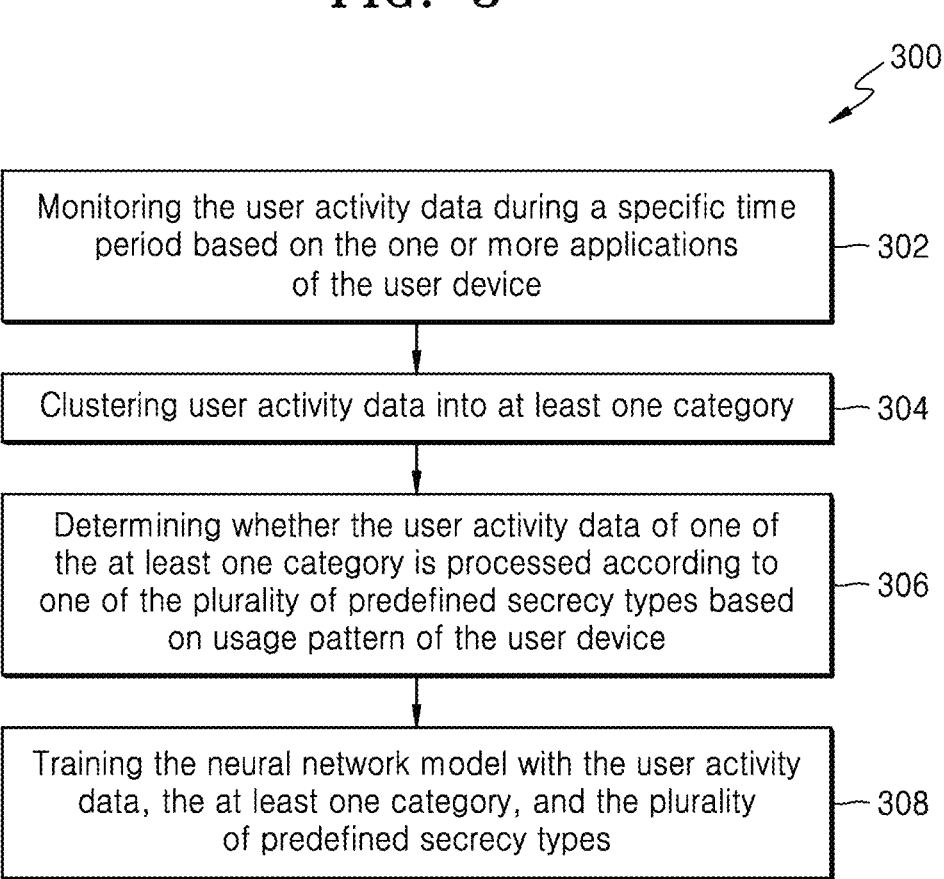
FIG. 3 illustrates a process flow depicting a method for training a neural network model with user activity data and a plurality of predefined secrecy types, according to an embodiment of the disclosure.

As detailed below, one or more steps of the method of FIG. 2 may utilize a machine learning (ML) model, such as a trained neural network model. The training of the ML model may be performed, as illustrated in FIG. 3 of the disclosure.

Referring to FIG. 2, a method 200 comprises, at operation 202, monitoring user activity data based on usage of one or more applications of the user device. The one or more applications may correspond to pre-installed software applications at the user device. In one embodiment, the one or more applications may include an operating system of the user device. The user device may include, but not limited to, a mobile phone, laptop, computer, smart TV, smart watch, etc. In an embodiment, the user activity data may comprise, but not limited to, one or more of application activity data, user actions, usage pattern of the user device, demographics information, call history, messages, and emails. Thus, the user actions as inferred from one or more installed applications at the user device may be observed and collected. Based on the monitored user activity data, a user context may be determined.

At operation 204, the method 200 comprises determining, via a neural network model, whether the user is exhibiting secretive behavior based on the user activity data and historical behavior of the user. In an embodiment, the secretive behavior comprises one of a normal behavior and a secret behavior. In an embodiment, the determining whether the user is exhibiting secretive behavior comprises clustering the user activity data into at least one predefined category. Further, the method 200 at operation 204 comprises determining whether the user activity data of one of the at least one predefined category is to be processed according to one of the plurality of predefined secrecy types based on a usage pattern of the user device, wherein the plurality of predefined secrecy types corresponds to the secretive behavior.

At operation 206, the method 200 comprises extracting contextual information from other applications. The other applications may correspond to another set of one or more software applications installed at the user device. In an embodiment, the other applications may be different from one or more applications used in operation 202. In an embodiment, at least one of the other applications may be similar to the one or more applications used in operation 202. In an embodiment, the contextual information comprises at least one of conversations, application data, application activities, application usage, and search patterns at the user device.

At operation 208, the method 200 comprises determining whether the contextual information is related to the user activity data/secretive behavior. If it is determined that the contextual information is not related to the user activity data/secrecy behavior, then the secrecy/secretive behavior may be directly sent to secrecy type decider module function defined at operation 214 to determine a predefined secrecy type. Based on a determination that the received contextual information is related to current user activity data, the method moves to operation 210.

At operation 210, the method 200 comprises processing, based on the secretive behavior, the contextual information to provide at least one data stream and at least one attribute associated with the contextual information. In an embodiment, the at least one attribute associated with the contextual information comprises deletion history and application activity. Further, the at least one data stream may comprise at least one of audio data stream, image data stream, and video data stream captured on the user device.

At operation 212, the method 200 comprises analyzing the at least one data stream and the at least one attribute to determine whether the user activity data should be processed according to one of a plurality of predefined secrecy types. In an embodiment, analyzing the at least one data stream and the at least one attribute comprises analyzing, by one or more neural network models, the at least one data stream and the at least one attribute to determine whether the stream is one of public or private. Further, the method at operation 212 may include determining whether the user activity data should be processed according to one of the plurality of predefined secrecy types in response to the determination whether the at least one data stream is one of public or private.

At operation 214, the method 200 comprises determining a predefined secrecy type, of the plurality of predefined secrecy types, based on the analysis. The predefined secrecy types may include, but not limited to, S1 (normal mode), S2 (a network secrecy mode with a first set of secrecy settings), and S3 (users/applications secrecy mode with a second set of secrecy settings).

At operation 216, the method 200 comprises applying secrecy settings on the user device based on the predefined secrecy type. In an embodiment, applying the secrecy settings based on the predefined secrecy type comprises modifying at least one of display, tracking, cookie, download, and history settings at the user device. More specifically, applying the secrecy settings based on the predefined secrecy type may comprise one or more of modifying current user interface content at the user device, modifying a tracking status of the one or more applications at the user device, modifying the cookie status of the one or more applications at the user device, modifying the downloading status of the one or more applications at the user device, and modifying the history storage settings of the one or more applications at the user device.

Figure 5A:
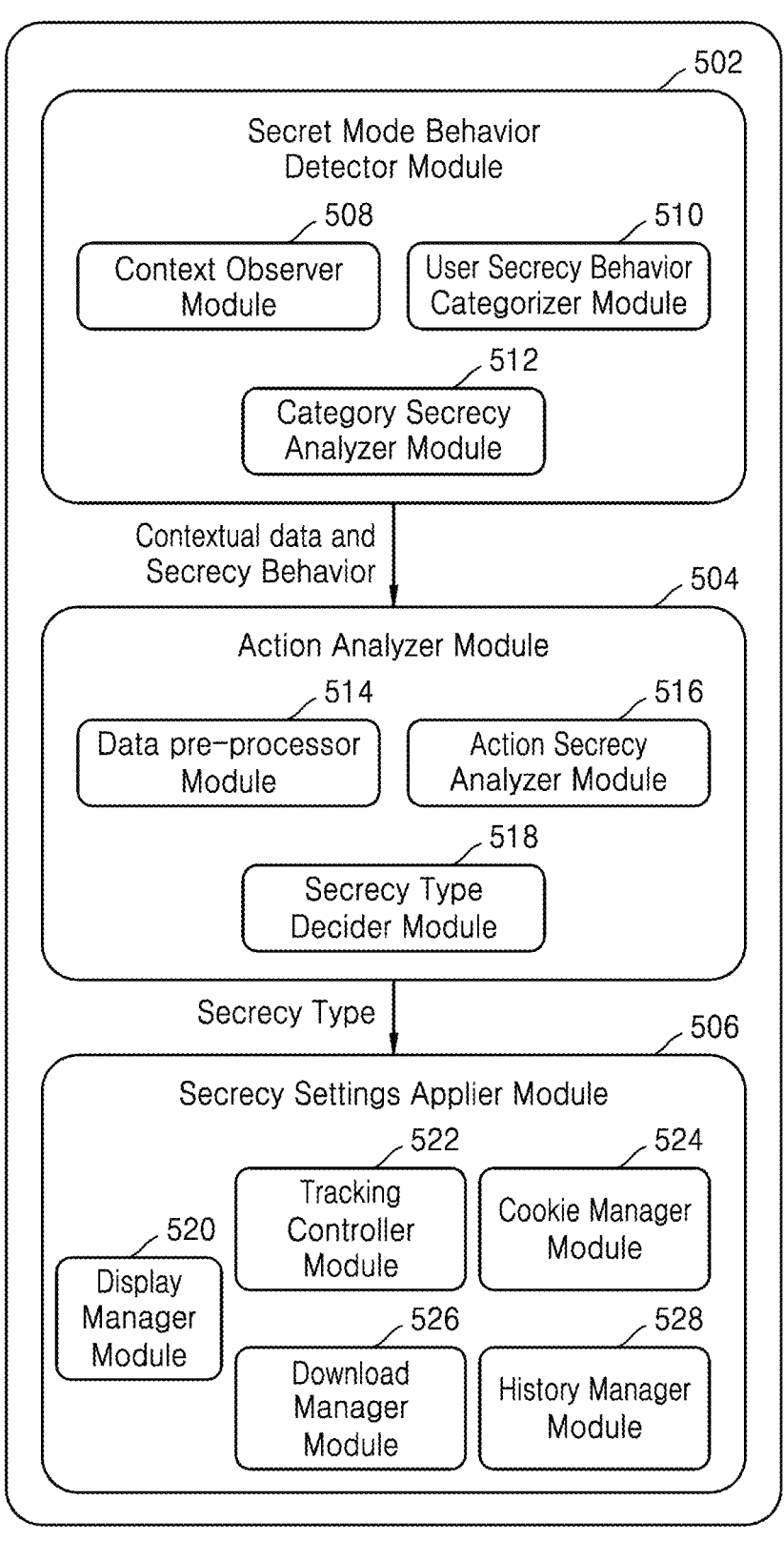
FIG. 5A illustrates a schematic block diagram of modules of a system for secret modes invocation to apply secrecy settings on a user device, according to an embodiment of the disclosure.
Figure 5B:
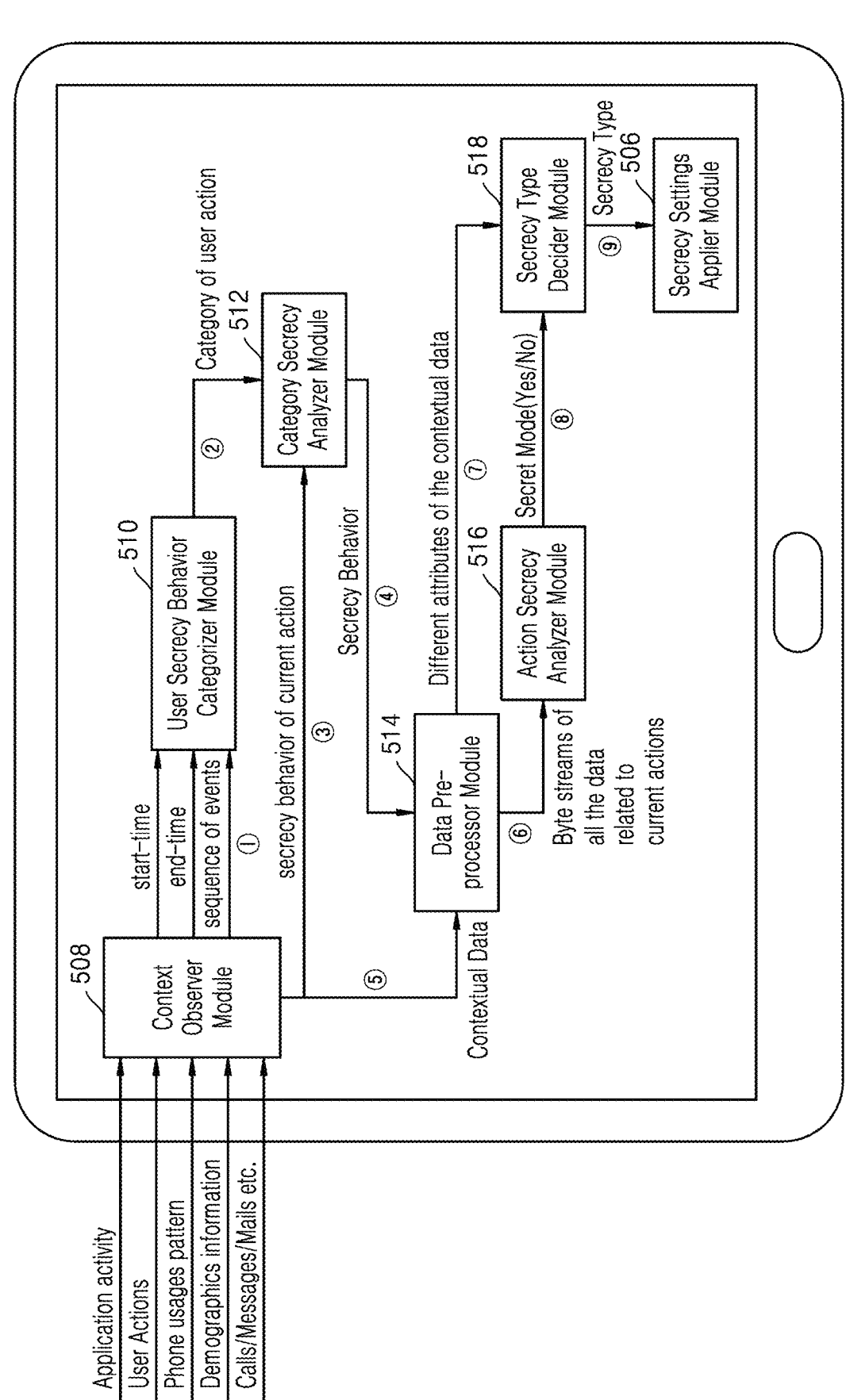
FIG. 5B illustrates a detailed schematic block diagram of modules of a system for secret modes invocation to apply secrecy settings on a user device, according to an embodiment of the disclosure.

The above operations of FIGS. 1 and 2 are discussed in more detail in conjunction with description of various modules performing these operations, as provided in FIGS. 5A and 5B of the disclosure.

FIG. 3 illustrates a process flow depicting a method for training a neural network model with user activity data and a plurality of predefined secrecy types to apply secrecy settings, according to an embodiment of the disclosure.

In one embodiment, the operations 302-308 of FIG. 3 may be executed before the operations of FIG. 2. In an embodiment, at least some of the operations 302-308 of FIG. 3 may overlap with some of the operations of FIG. 2. In other words, the model training as detailed out in FIG. 3 may be performed while execution of the operations in FIG. 2.

Referring to FIG. 3, a method 300 comprises, at operation 302, monitoring the user activity data during a specific time period based on the one or more applications of the user device. The monitoring of the user activity data is discussed in detail in conjunction with operation 202, and further with respect to FIG. 5B. Hence, for the sake of brevity, this is not discussed in detail here.

At operation 304, the method 300 comprises clustering user activity data into at least one category. The clustering of user activity data is discussed in detail in conjunction with operation 204, and further with respect to FIG. 5B. Hence, for the sake of brevity, this is not discussed in detail here.

At operation 306, the method 300 comprises determining whether the user activity data of one of the at least one category is processed according to one of the plurality of predefined secrecy types based on usage pattern of the user device. This step is discussed in detail in conjunction with operation 204, and further with respect to FIG. 5B. Hence, for the sake of brevity, this is not discussed in detail here.

At operation 308, the method 300 comprises training a neural network model with the user activity data, the at least one category, and the plurality of predefined secrecy types. The user activity data, the at least one category, and the plurality of predefined secrecy types is discussed in conjunction with FIGS. 2 and 5B. Hence, for the sake of brevity, this is not discussed in detail here.

Figure 4:
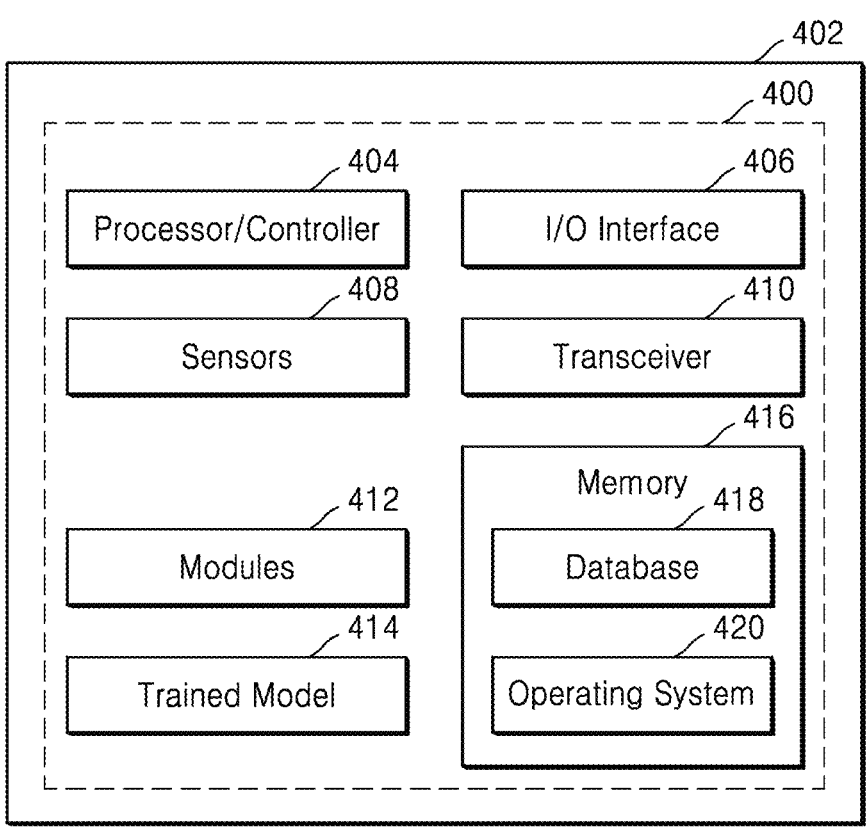
FIG. 4 illustrates schematic block diagram of a system for providing secret modes invocation to apply secrecy settings on a user device, according to an embodiment of the disclosure.

FIG. 4 illustrates schematic block diagram of a system for applying secrecy settings on an electronic device, according to an embodiment of the disclosure.

Referring to FIG. 4, in one embodiment, a system 400 may be included within an electronic device (e.g., a user device) 402. In an embodiments, the system 400 may be configured to operate as a standalone device or a system. Examples of user device may include, but not limited to, a mobile phone, a laptop computer, a desktop computer, a personal computer (PC), a notebook, a tablet, a smart watch, and e-book readers, or any electronic device capable of providing search/browsing functions to users.

In one embodiment, the user device 402 may include the system 400 which is configured to analyze user behavior to create a model for user's secrecy, decide the secret mode based on the secrecy model and current actions, determining the secrecy type based on current actions, and managing secret modes based on secrecy types. The system 400 may further include a processor/controller 404, an I/O interface 406, sensors 408, a transceiver 410, modules 412, a trained model 414, and memory 416. The sensors 408 may be configured to sense the touch gesture or touch input provided by the user via the display/user interface of the user device 402.

In some embodiments, the memory 416 may be communicatively coupled to the at least one processor/controller 404. The memory 416 may be configured to store data, instructions executable by the at least one processor/controller 404. In one embodiment, the memory 416 may include the modules 412 along with a database 418 to store data, and the trained model 414. In an embodiments, the modules 412 and the trained model 414 may be provided as standalone hardware/software units as a part of the user device 402. In an embodiments, the modules 412 and the trained model 414 may be provided outside the user device 402 via a remote function through a network. The modules 412 may include a set of instructions that may be executed to cause the system 400 to perform any one or more of the methods disclosed herein. The modules 412 may be configured to perform the steps of the disclosure using the data stored in the database 418 and the trained model 414. In an embodiment, each of the one or more modules 412 may be a hardware unit. Further, the memory 416 may include an operating system 420 for performing one or more tasks of the system 400 and/or user device 402, as performed by a generic operating system in the communications domain. The transceiver 410 may be capable of communicating data or signals to and from the user device 402. For the sake of brevity, the architecture and standard operations of the operating system 420, memory 416, database 418, processor/controller 404, transceiver 410, and I/O interface 406 are not discussed in detail.

In one embodiment, the memory 416 may communicate via a bus within the system 400. The memory 416 may include, but not limited to, a non-transitory computer-readable storage media, such as various types of volatile and non-volatile storage media including, but not limited to, random access memory, read-only memory, programmable read-only memory, electrically programmable read-only memory, electrically erasable read-only memory, flash memory, magnetic tape or disk, optical media and the like. In one example, the memory 416 may include a cache or random-access memory for the processor/controller 404. In alternative examples, the memory 416 is separate from the processor/controller 404, such as cache memory of a processor, the system memory, or other memory. The memory 416 may be an external storage device or database for storing data. The memory 416 may be operable to store instructions executable by the processor/controller 404. The functions, acts or tasks illustrated in the figures or described may be performed by the programmed processor/controller 404 for executing the instructions stored in the memory 416. The functions, acts or tasks are independent of the particular type of instructions set, storage media, processor or processing strategy and may be performed by software, hardware, integrated circuits, firmware, micro-code and the like, operating alone or in combination. Likewise, processing strategies may include multiprocessing, multitasking, parallel processing, and the like.

Further, the disclosure contemplates a computer-readable medium that includes instructions or receives and executes instructions responsive to a propagated signal, so that the user device (e.g., mobile device) 402 connected to a network may communicate voice, video, audio, images, or any other data over a network. Further, the instructions may be transmitted or received over the network via a communication port or interface or using a bus (not shown). The communication port or interface may be a part of the processor/controller 404 or may be a separate component. The communication port may be created in software or may be a physical connection in hardware. The communication port may be configured to connect with a network, external media, the display, or any other components in system, or combinations thereof. The connection with the network may be a physical connection, such as a wired Ethernet connection or may be established wirelessly. Likewise, the additional connections with other components of the system 400 may be physical or may be established wirelessly. The network may alternatively be directly connected to the bus.

In one embodiment, the processor/controller 404 may include at least one data processor for executing processes in a virtual storage area network. The processor/controller 404 may include specialized processing units such as, integrated system (bus) controllers, memory management control units, floating point units, graphics processing units, digital signal processing units, etc. In one embodiment, the processor/controller 404 may include a central processing unit (CPU), a graphics processing unit (GPU), or both. The processor/controller 404 may be one or more general processors, digital signal processors, application-specific integrated circuits, field-programmable gate arrays, servers, networks, digital circuits, analog circuits, combinations thereof, or other now known or later developed devices for analyzing and processing data. The processor/controller 404 may implement a software program, such as code generated manually (i.e., programmed).

The processor/controller 404 may be disposed in communication with one or more input/output (I/O) devices via the I/O interface 406. The I/O interface 406 may employ communication code-division multiple access (CDMA), high-speed packet access (HSPA+), global system for mobile communications (GSM), long-term evolution (LTE), worldwide interoperability for microwave access (WiMax), or the like), etc.

Using the I/O interface 406, the user device 402 may communicate with one or more I/O devices. For example, the input device may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The output devices may be a printer, fax machine, video display (e.g., cathode ray tube (CRT), liquid crystal display (LCD), light-emitting diode (LED), plasma, plasma display panel (PDP), organic light-emitting diode display (OLED) or the like), audio speaker, etc.

The processor/controller 404 may be disposed in communication with a communication network via a network interface. The network interface may be the I/O interface. The network interface may connect to a communication network. The network interface may employ connection protocols including, without limitation, direct connect, ethernet (e.g., twisted pair 10/100/1000 Base T), transmission control protocol/internet protocol (TCP/IP), token ring, IEEE 802.11a/b/g/n/x, etc. The communication network may include, without limitation, a direct interconnection, local area network (LAN), wide area network (WAN), wireless network (e.g., using wireless application protocol), the Internet, etc. Using the network interface and the communication network, the device may communicate with other devices. The network interface may employ connection protocols including, but not limited to, direct connect, ethernet (e.g., twisted pair 10/100/1000 Base T), transmission control protocol/internet protocol (TCP/IP), token ring, IEEE 802.11a/b/g/n/x, etc.

FIG. 5A illustrates a schematic block diagram of modules of a system for secret modes invocation to apply secrecy settings on a user device, according to an embodiment of the disclosure.

FIG. 5B illustrates a detailed schematic block diagram of modules of a system for secret modes invocation to apply secrecy settings on a user device, according to an embodiment of the disclosure.

FIGS. 5A and 5B are described in conjunction with each other, since these represent a flow and processing of data among various modules in a system of the disclosure, according to various embodiments of the disclosure.

Referring to FIGS. 5A and 5B, in one embodiment, the modules 412 may include a secret mode behavior detector module 502, an action analyzer module 504, and a secrecy settings applier module 506.

In one embodiment, the secret mode behavior detector module 502 may be configured to take the user activity data as an input and analyze the user activity data based on the user's past behavior and outputs the secrecy behavior, i.e., secret or normal. In an embodiment, the secret mode behavior detector module 502 may comprise a context observer module 508, a user secrecy behavior categorizer module 510, and a category secrecy analyzer module 512.

Specifically, the context observer module 508 may be configured to monitor the user activity data comprising, but not limited to, one or more of application activity data, user actions, usage pattern of the user device, demographics information, call history, messages, and emails. The user may take various type of actions at the user device or one or more installed applications, such as executing queries, click-through behavior associated with user actions, any software functionality, or demographic information of executed queries. In an embodiment, the executing queries may comprise search strings, such as searching for a trip on at least one installed application within the user device. Further, the click-through behavior associated with user actions may include, but not limited to, opening a given content, printing a given content, selecting links of other web contents embedded in a given content, sending a link of a given content to another user via e-mails or texts or calls or any social media platforms, adding a selected content to a favorites list. Additionally, any software functionality may include, but not limited to, formatting to a selected content, deleting a selected content, hiding a selected content, and downloading a selected content. Also, the demographic information of the executed queries may include, but not limited to, the place and time of the execution of the query. Moreover, the context observer module 508 may be configured to record a start time and an end time of each of the above events related to monitored user activity.

In an embodiment, the user secrecy behavior categorizer module 510 may be configured to clustering/grouping user's actions into one or more predefined categories. Each user action may be initially assigned a unique category. Subsequently, the actions may be merged into the category of the similar actions.

Figure 6:
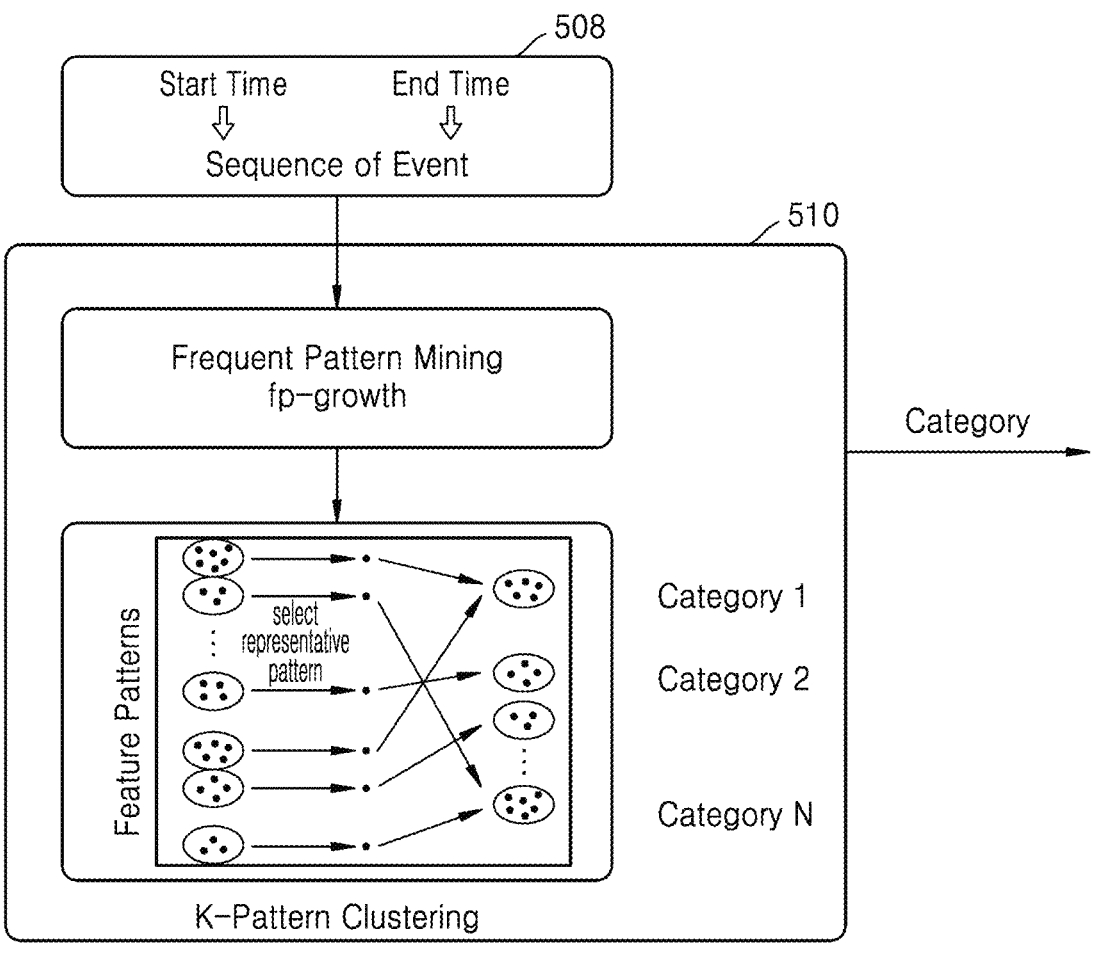
FIG. 6 illustrates a embodiment of categorizing user actions, according to an embodiment of the disclosure.

FIG. 6 illustrates an embodiment of categorizing user actions, in according to an embodiment of the disclosure.

Referring to FIG. 6, a manner of categorizing user actions is illustrated in FIG. 6. In an embodiment, the user secrecy behavior categorizer module 510 may create a usage pattern for the user device corresponding to received sequence of actions using frequent pattern mining algorithms, for example, the frequent pattern growth (FP-growth). As known in the art, the FP-growth is a scalable technique that uses an extended prefix-tree structure to store compressed and crucial information about frequent patterns. The FP-growth is provided as an input to the K-pattern clustering, and it groups similar patterns by using the frequent activity patterns' mining. Thus, the user activity data is clustered into one or more predefined categories, as depicted in FIG. 6. Examples of predefined categories may include, but not limited to, shopping for gift, family vacation, study, adult content, etc.

In an embodiment, the category secrecy analyzer module 512 may be configured to determine the secrecy/secretive behavior, i.e., whether the secrecy behavior is normal or secret for the received category from the user secrecy behavior categorizer module 510 using data of user's historical behavior. The normal or secret behavior may correspond to the predefined secrecy types. Further, the category secrecy analyzer module may be configured to store the secrecy behavior corresponding to each category in a database. For example, the user's action of searching for a trip falls under the secrecy behavior of normal mode, as in the training data it may be seen that user does this action time to time without any dependency on any of the event.

Specifically, the category secrecy analyzer module 512 may be configured to keep a count of the secrecy behavior for a particular category, which may be used for training the secret mode behavior detector module 502. Further, the category secrecy analyzer module 512 may be configured to determine the current secrecy behavior of monitored user activity and may increase the corresponding counter. Also, the category secrecy analyzer module 512 may be configured to set the secrecy behavior for the category as normal if the counter for normal mode is more than the secret mode for an activity. The secret mode behavior detector module 502 is trained based on the counter and secrecy type of each category and activity. The category secrecy analyzer module 512 may store the secrecy behavior and category as a one-to-one mapping for future usage. During determination of secrecy behavior, the category secrecy analyzer module 512 may be configured to receive the category from the user secrecy behavior categorizer module 510, and map the category with the secrecy behavior.

Figure 7:
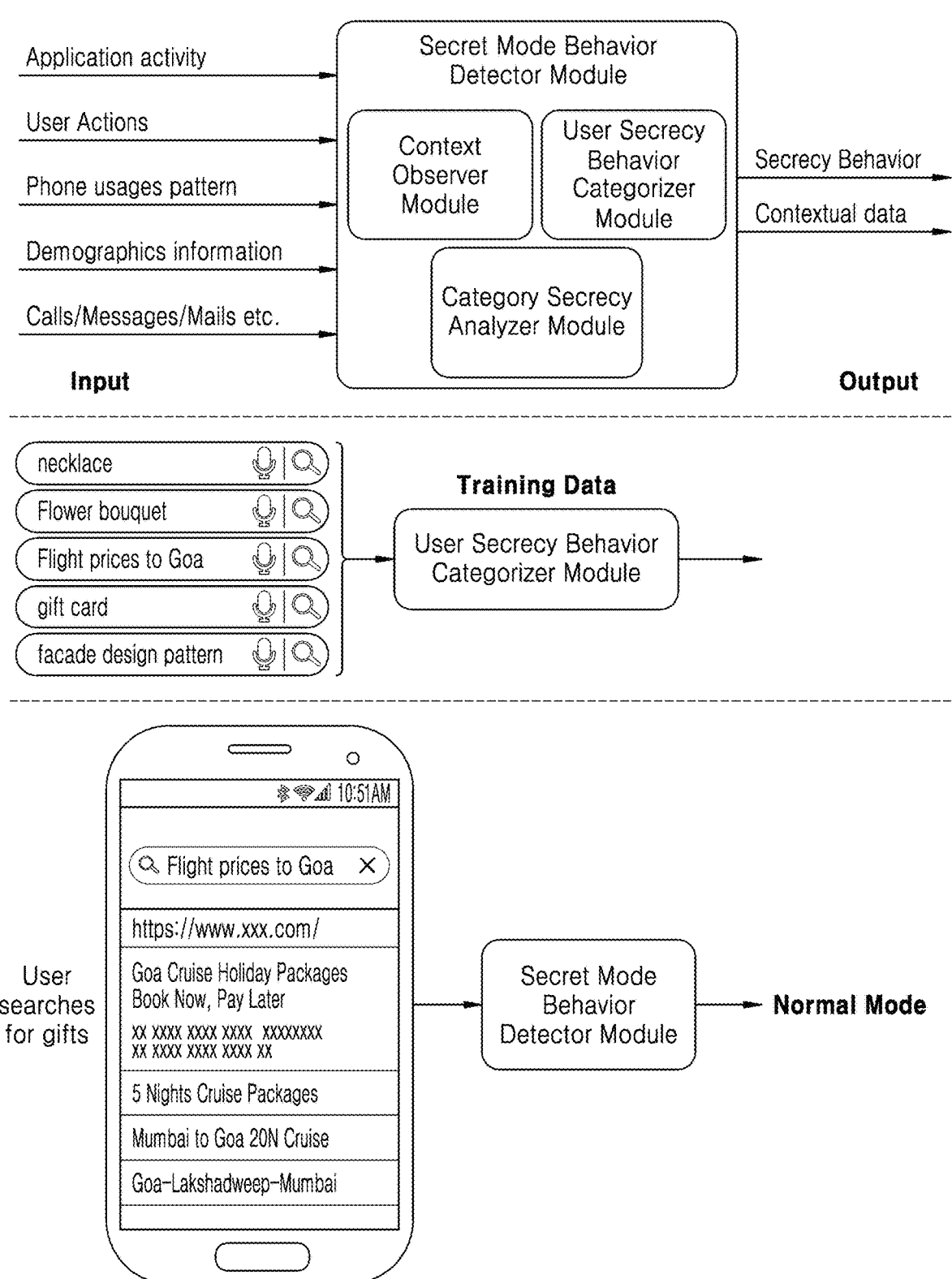
FIG. 7 illustrates a process flow for analyzing behavior to create a model for user's secrecy at a secret mode behavior detector module, according to an embodiment of the disclosure.

FIG. 7 illustrates a process flow for analyzing behavior to create a model for user's secrecy at a secret mode behavior detector module, according to an embodiment of the disclosure.

Referring to FIG. 7, as depicted, the user secrecy behavior categorizer module is continuously trained with various user search activities, such as search string related to necklace, flower bouquet, flight price to Goa, gift card, and facade design pattern. Based on the trained data, the secret mode behavior detector module 502 may be configured to detect the secret or normal mode for the user device.

Continuing with the explanation of FIG. 5B, the action analyzer module 504 may be configured to receive contextual data associated with the user, and secrecy behavior as determined by the secret mode behavior detector module 502 as inputs, to determine the secrecy type (i.e., why the user wants to implement secret mode(s)). The action analyzer module 504 may include a data pre-processor module 514, an action secrecy analyzer module 516, and a secrecy type decider module 518.

In one embodiment, the data pre-processor module 514 may be configured to receive contextual data/information from one or more other applications pre-configured or installed in the user device. First, the data pre-processor module 514 may be configured to determine whether the received contextual information is related to current user activity data, which comprises user actions as previously determined by the secret mode behavior detector module 502. To perform the determination, the data pre-processor module 514 may be configured to parse the contextual information to determine the category. Further, the data pre-processor module 514 may be configured to analyze if the determined category may be mapped to the user's action category determined previously based on current user activity data. If it is determined that the contextual information is not related to the secrecy behavior, then the secrecy behavior may be directly sent to secrecy type decider module 518.

In an embodiment, the contextual information comprises at least one of conversations, events, application data, application activities, application usage, and search patterns at the user device. The conversations may include surprises, gifts, etc. The events may include event_type, event_info etc. The search patterns may include search_string, is_secret, del_history, is_ad_blocker, etc. The application activities may include app_name, is_secure, activity, etc. In an embodiment, the contextual information may include time, location, recipient, etc.

Based on a determination that the received contextual information is related to current user activity data, the data pre-processor module 514 may be configured to process, based on the secretive/secrecy behavior, the contextual information and extract an output in the form of at least one data stream and at least one attribute. For example, the user activity information may correspond to category of shopping gift, while the contextual information may include a conversation related to anniversary or birthday. Alternatively, the contextual information extracted from an event created in the calendar application of user device which may also indicate an anniversary or birthday. Accordingly, it may be determined that the received contextual information and the current user activity data are related. Further, in an embodiment, the at least one data stream may comprise bytes from each type of data, such as audio, video, and/or images. Further, the at least one attribute may include delete history, activity, etc. as extracted from the contextual information.

Further, in an embodiment, the action secrecy analyzer module 516 may be configured to analyze the pre-processed data, i.e., the at least one data stream and the at least one attribute associated with the contextual information. In an embodiment, the at least one attribute associated with the contextual information comprises deletion history and application activity. Further, the at least one data stream may comprise at least one of audio data stream, image data stream, and video data stream captured on the user device.

Figure 8:
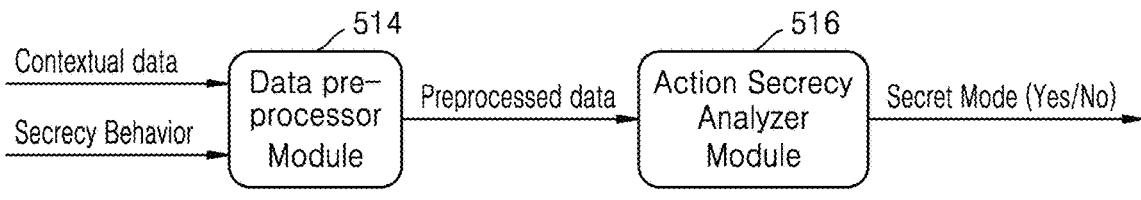
FIG. 8 illustrates a process flow for deciding a secret mode based on a secrecy model and current actions at an action analyzer module, according to an embodiment of the disclosure.
Figure 8:
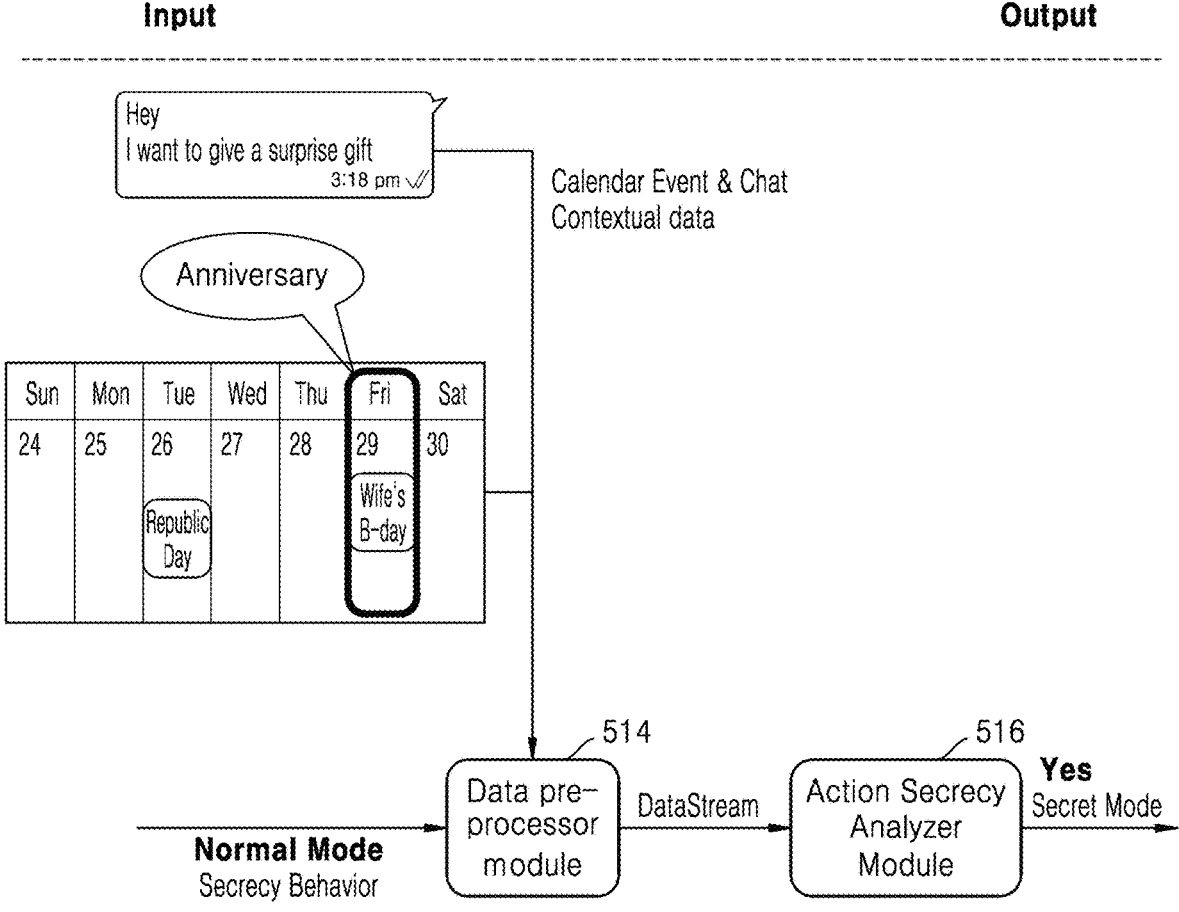

FIG. 8 illustrates a process flow for deciding a secret mode based on a secrecy model and current actions at an action analyzer module, according to an embodiment of the disclosure.

Referring to FIG. 8, a process flow provides for different sub-modules of action analyzer module 504. As depicted, the output of the mode in which user's action should be processed is secret, even if training data indicates that it should be processed in normal mode, because the calendar event changed the user's action's context.

Figure 9:
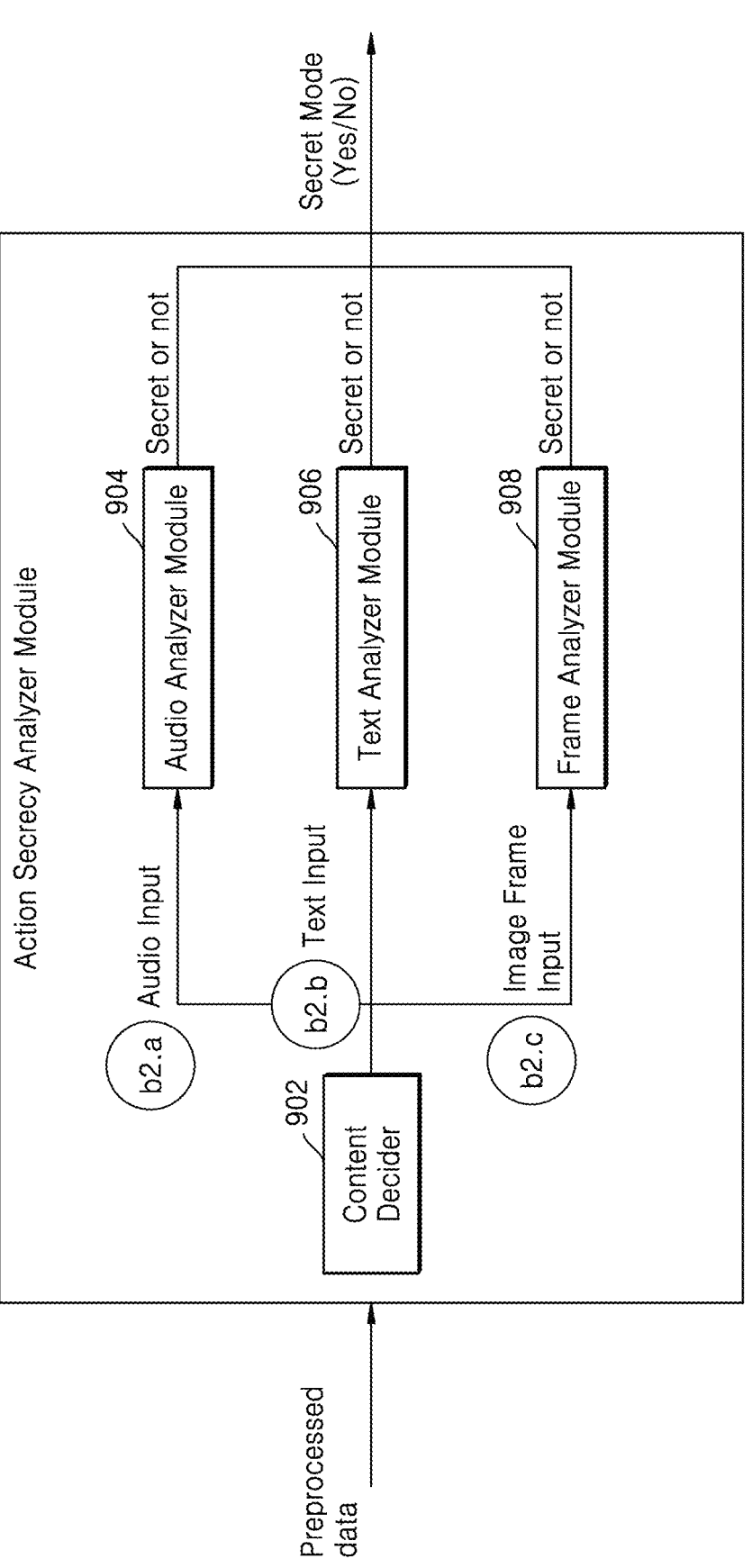
FIG. 9 illustrates an action secrecy analyzer module for processing data streams and attributes, according to an embodiment of the disclosure.

FIG. 9 illustrates an action secrecy analyzer module for processing data streams and attributes, according to an embodiment of the disclosure.

Referring to FIG. 9, the action secrecy analyzer module 516 may comprise a content decider module which facilitates in redirecting the preprocessed data streams to one or more respective neural networks (NNs) to flag the stream as public and private. In other words, the input from the data pre-processor module 514 may be passed to a content decider module 902 to determine what type of content it is (audio, frame or textual), which may then be forwarded to different NNs for further processing. In an embodiment, the action secrecy analyzer module 516 may comprise an audio analyzer module 904, a text analyzer module 906 and a frame analyzer module 908, each comprising an NN for processing of the respective data streams and attributes. Further, based on the analysis/processing by each of the audio analyzer module 904, the text analyzer module 906 and the frame analyzer module 908, an integer value will be given as output that will represent if the data should be processed in secret mode or not. If a unanimous integer output is provided that data is public, then only the output will be "secret mode=NO," otherwise the output will be "Secret Mode=Yes." More specifically, if one or more of the NNs associated with audio analyzer module 904, the text analyzer module 906 and the frame analyzer module 908 provide an integer output indicating that the data should be processed in secret mode, then the final output will indicate that the secret mode should be ON. Further, the action secrecy analyzer module 516 will keep getting trained based upon user's actions.

In one embodiment, the audio analyzer module 904 may include an NN model for analysis of the data stream and attributes. In an embodiment, the audio analyzer NN model may include a deep learning model that takes the audio stream as an input and outputs whether the stream is private or public. As an input, the sound stream may be converted into audio wave signals and then into spectrogram. For example, the sound stream may correspond to conversations recorded around the user device. Further, the spectrogram obtained from the audio wave may be fed into a convolutional neural network (CNN) model, and the output may be feature maps. These feature maps will be passed to a linear classifier model which will classify if the sound is private or public. For instance, if the audio stream contains people speaking, then there may be 2 cases: a) audio stream metadata contains the text of the file—it will be analyzed by the text analyzer NN model and private content will be found; or b) if meta data does not have the information, the audio will be converted into text and then text analyzer module 906 will find the private content.

In an embodiment, the text analyzer module 906 may include an NN model for analysis of the text data steam and associated attributes. The NN model may be a deep learning model that takes the set of text as an input, and outputs whether the text is private or public. The model uses two components: a CNN Layer which is used to find out the feature set of the words, and a bi-directional long-short term memory (LS™) which takes the feature set as an input and finds out the private word or if the sentence is private. The bidirectional LSTMs are an extension of traditional LSTMs that can improve model performance on sequence classification problems. It keeps track of all time steps of the input sequence. The bidirectional LSTMs train two instead of one LSTMs on the input sequence.

In an embodiment, the frame analyzer module 908 may include an NN model for analysis of the video or images associated with the corresponding data stream and the attributes. The NN model may be a deep learning model that takes the image as an input and outputs if the image is private/public. The NN model uses two CNNs including a privacy CNN (PCNN) which may be used to extract the convolution feature, and an object CNN (OCNN) which may be used to extract object level features. The two CNNs are connected at the output layer for computational efficiency. The method leverages the usage of object and convolutional features to improve photo privacy detection accuracy. For example, nude photos should be private and the business portrait photos should be public.

Referring to FIG. 5B, the action secrecy analyzer module 516 may be configured to determine whether the user activity data should be processed according to one of the plurality of predefined secrecy types in response to the determination whether the at least one data stream is one of public or private. The plurality of predefined secrecy types are discussed hereinafter.

In an embodiment, the secrecy type decider module 518 may be configured to receive the pre-processed data, and the secret mode (whether yes/no) from the action secrecy analyzer module 516 and determine which type of secrecy should be implemented for the current user activity. The secrecy type decider module may be configured to analyze the user action, create a random forest and determine the secrecy type between S1, S2, and S3 based on a majority vote among the decision trees.

Figure 19:
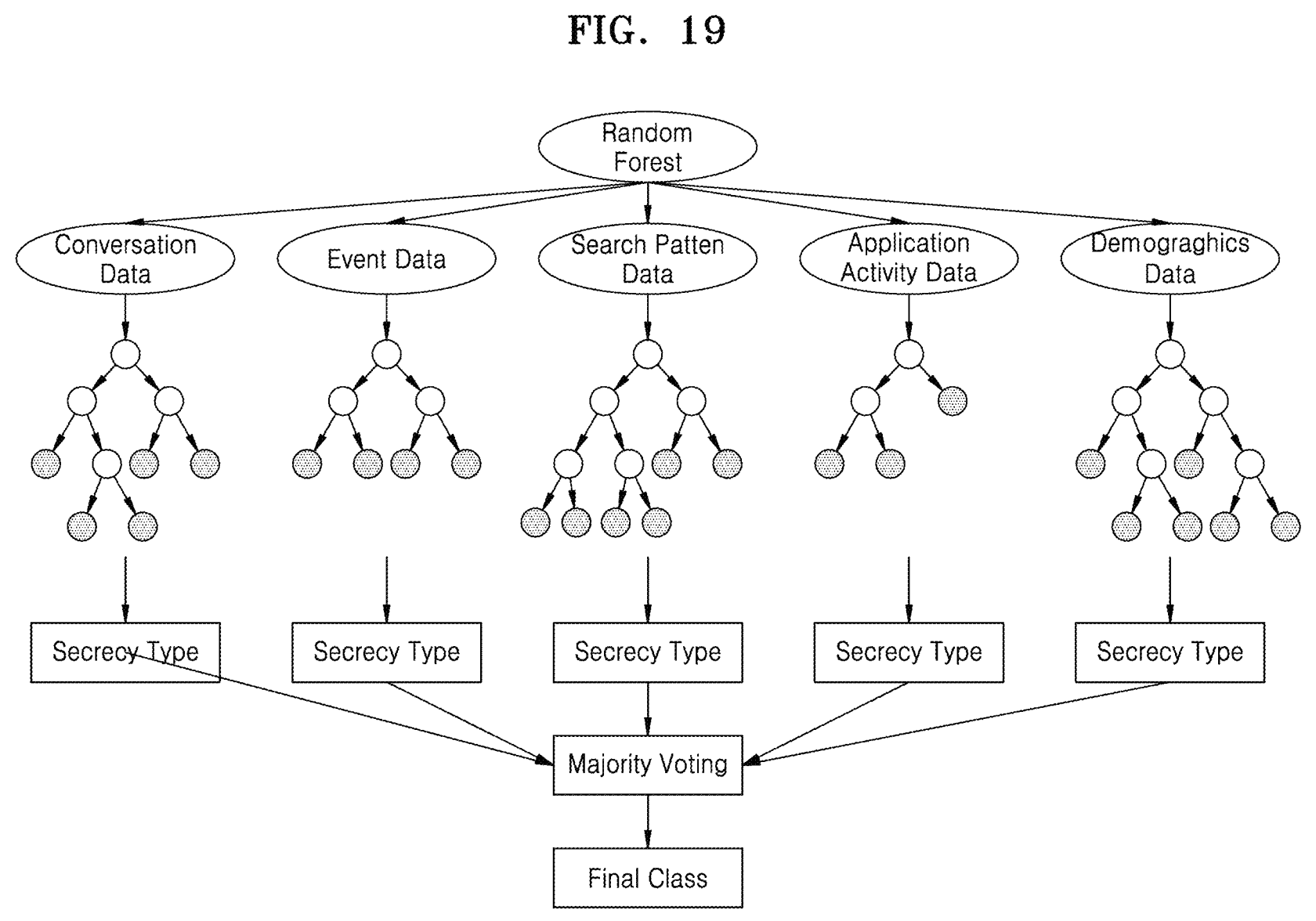

FIG. 19 illustrates a random forest to analyze the user action and determine secrecy type by secrecy type decider module, according to an embodiment of the disclosure.

Referring to FIG. 19, the secrecy type decider module 518 may be configured to create a random forest out of provided contextual data (conversations, application activities, application usage, search patterns, etc.), as depicted in FIG. 19. Random Forest is a classifier that contains a plurality of decision trees. Each decision tree will take one type of contextual data as an input and attribute of the data is created as a node. Thus, the random forest comprises multiple decision trees, such as, for example, event decision tree, conversation decision tree, search pattern decision tree, demographic based decision tree for handling different types of data. The branches from the node correspond to possible values of that attribute. Further, the leaf nodes supply the values to be returned if that leaf is reached. Instead of relying on one decision tree, the random forest takes the prediction from each tree and based on the majority votes of predictions, and it predicts the final output. The majority rule is a decision rule that selects alternatives which have a majority, i.e., more than half the votes. It is the binary decision rule used most often in influential decision-making bodies The steps to draw and calculate the output of each decision tree in the forest is as defined hereinafter. The attribute which is the most informative among the attributes is selected as "splitting attribute." Each branch is a possible value of that attribute. Entropy is the measure of informativeness of a node. If all records belongs to the same class, then Entropy=0. If records are equally distributed over collection class, then Entropy=1. The general formula of entropy for a dataset of (k) classes is as follows:

wherein,E(D) corresponds to entropy of data, and Pi=frequentist probability of element "i" in the data.

$$E(D) = \sum_{n=1}^{k} (-p_i \log p_i) \qquad \text{Equation 1}$$

For the sake of simplicity, only two classes, i.e., a secret mode class and a normal mode class may be considered. Therefore 'i' here could be either secret or normal. So, if a total of 100 data points are considered in the dataset with 30 data points belonging to the secret class and 70 belonging to the normal class, then 'P_secret' would be 3/10 and 'P_normal' would be 7/10.

For example, the disclosure includes application activities decision tree having attributes AppName, is_secure, and activity, so, $$k = 3: E(D) = -p_1 \log p_1 - p_2 \log p_2 - p_3 \log p_3 \qquad \text{Equation 2}$$

The attribute with greatest information gain is selected as the splitting attribute and the data set is split for all distinct values of splitting attribute.

$$\text{Gain}(D, V) = E(D) - \sum \frac{D_v}{D} \times E(D_v) \qquad \text{Equation 3}$$

wherein Gain is the set of data that effects the decision the most,

D=Entire Data Set,

V=Attribute of data set (column), and

Dv=Type of values per attribute.

Figure 10:
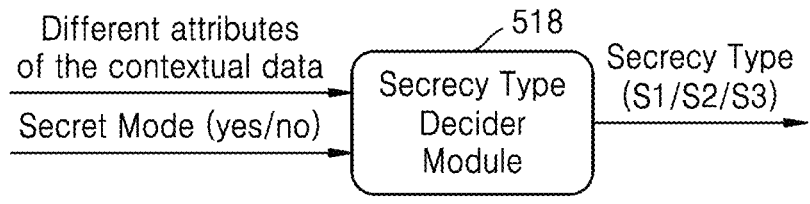
FIG. 10 illustrates a process flow for figuring out a secrecy type based on current actions at a secrecy type decider module, according to an embodiment of the disclosure.
Figure 10:
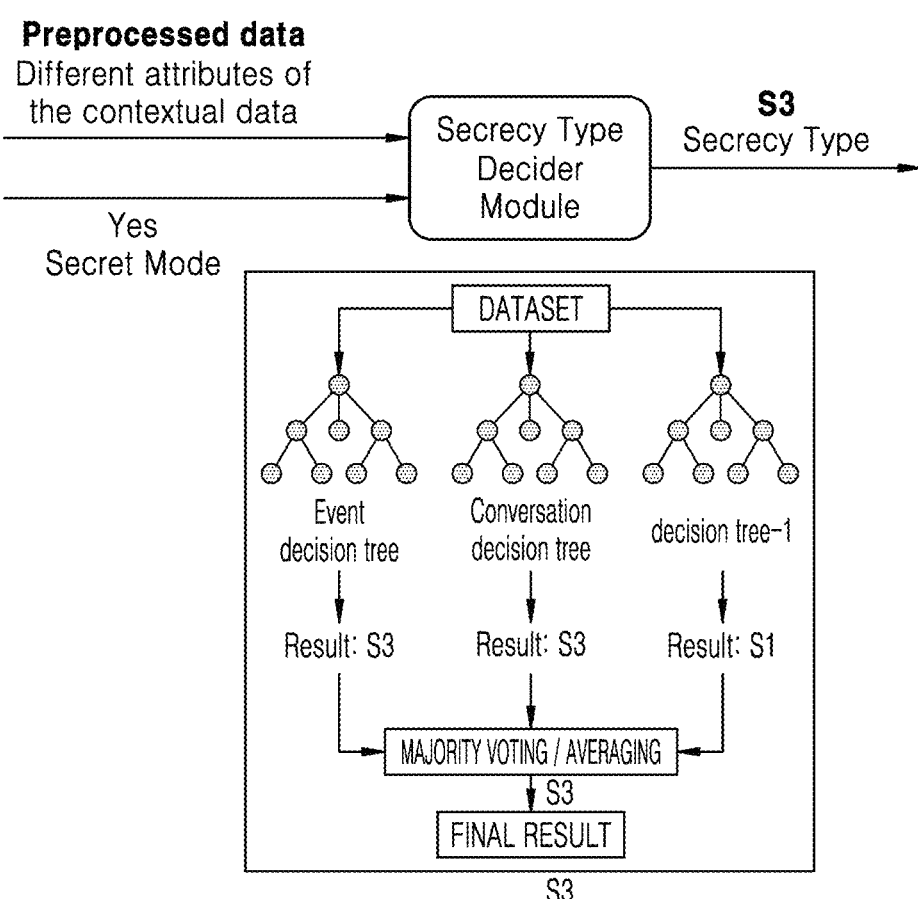

FIG. 10 illustrates a process flow for figuring out a secrecy type based on current actions at a secrecy type decider module, according to an embodiment of the disclosure.

Referring to FIG. 10, as illustrated, a majority decision S3 predefined secrecy type is selected based on majority decision of two out of three decision trees.

Referring to FIG. 5B, in one embodiment, the secrecy settings applier module 506 is configured to select some secrecy settings among all based on the predefined secrecy type (S1/S2/S3) and then applies them on the user device. The secrecy settings applier module 506 may be configured to select some secrecy settings and pass the secrecy type to selected internal modules 520-528, where each internal module will apply their respective changes. The internal module 520-528 may work in conjunction with one or more applications and/or the operating system of the user device, such as, but not limited to, a web-browser, a file manager or a download manager. For instance, the internal modules 520-528 may be configured to control one or more configurations of such applications and/or operating system of the user device.

In an embodiment, applying the secrecy settings based on the predefined secrecy type comprises modifying at least one of display, tracking, cookie, download, and history settings at the user device. More specifically, applying the secrecy settings based on the predefined secrecy type may comprise one or more of modifying current user interface content at the user device, modifying a tracking status of the one or more applications at the user device, modifying the cookie status of the one or more applications at the user device, modifying the downloading status of the one or more applications at the user device, and modifying the history storage settings of the one or more applications at the user device.

In an embodiment, the secrecy settings applier module 506 may include a display manager module 520, a tracking controller module 522, a cookie manager module 524, a download manager module 526, and a history manager module 528. The working of each module for applying the secrecy settings is discussed hereinafter.

In an embodiment, the cookie manager module 524 may be configured to control whether cookies for particular websites should be allowed or blocked based on the secrecy type. For example, for secrecy type S2, cookies may be blocked, while for secrecy type S3, cookies may be allowed. The cookie manager module 524 thus is associated with a privacy feature to reduce targeted ads; unlike blacklist approach. The cookie manager module 524 may be configured to use a supervised ML based (binary) classification technique to predict probable prevalent tracking domains. Further, the cookie manager module 524 potentially stops sharing web cookies to get generic ads and defer their load, so that benign resources load faster. Further, the cookie manager module 524 may use a pre-trained model (e.g., support vector machine (SVM) model) loaded in application to classify based on resources navigation features.

In an embodiment, the history manager module 528 may be configured to control whether history of user's actions should be saved or not based on secrecy type. If the secrecy type is S2, then the history may be saved, while in S3, the history may not be saved/synched.

In an embodiment, the tracking controller module 522 may be configured to control permissions that website/servers controls to track user, e.g., camera, location, microphone, user agent parameters, etc. are blocked.

In an embodiment, the display manager module 520 may be configured to use a deep learning model to analyze the content's privacy that is present on the screen and then control whether it should be shown or not based on the content's secrecy. The display screen's content may be divided into sub-parts. Each sub-part may be passed to a pre-trained CNN model. The CNN model may determine the features of the image. Those features may then be passed to the SVM model, which classifies the features and determine if the content is private or public. If the content is private, then it is hidden from the screen and only public data is inflated Thus, the display manager module 520 may control the user interface display of the user device.

In an embodiment, the download manager module 526 may be configured to pick the space where the content should be downloaded based on the secrecy type received. For instance, if the secrecy type is S2, then the downloads may be in a public space of the user device, while in S3, the downloads may be performed in a private space of the user device. The files downloaded in private can be opened/viewed only in that particular application and by an authenticated user only. No other application can access the data downloaded in secret mode.

Figure 11:
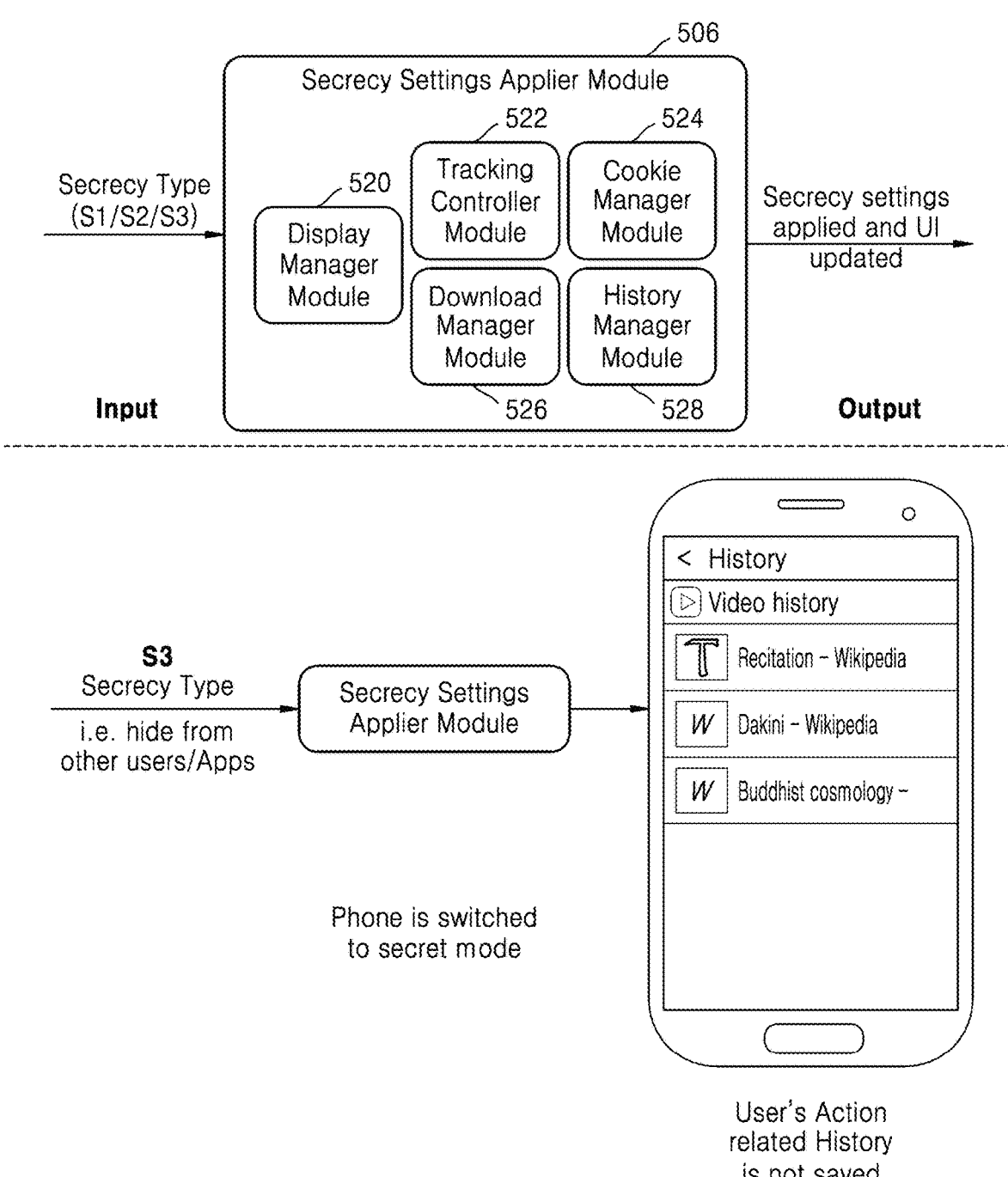
FIG. 11 illustrates a process flow for managing secret modes based on secrecy type, according to an embodiment of the disclosure.

FIG. 11 illustrates a process flow for managing secret modes based on secrecy type at a secrecy settings applier module, according to an embodiment of the disclosure.

Referring to FIG. 11, a secrecy settings applier module 506 will select some secrecy settings among all based on the secrecy type and then applies them. In the disclosure, even in the secret mode, some of the settings are applied. For example, history might be saved even when user is in secret mode. The secrecy settings applier module 506 selects some secrecy settings and passes the secrecy type to selected internal modules. Each internal module will apply their changes. Based on the secrecy type, selective secrecy settings are applied, and user interface (UI) related changed are updated (if some UI component need to be hidden/shown). A set of secrecy settings is shown in Table 1 below:

TABLE 1

| Secrecy Type | Display Manager | Download Manager | Cookie Manager | History manager | Anti - Tracking controller |
|---|---|---|---|---|---|
| S1 | Do nothing | Do nothing | Do nothing | Do nothing | Do nothing |
| S2 | No need to hide content | Can be downloaded in public space | Blocked | Saved | Should be Turned ON |
| S3 | Content may be updated | Downloaded in browser only | Allowed | Not Saved | Should be Turned ON |

Example: As soon as secrecy type is received, secrecy settings applier starts applying the changes and user's action related history is not saved. Similarly other modules, as shown in the table above make changes.

Figure 12:
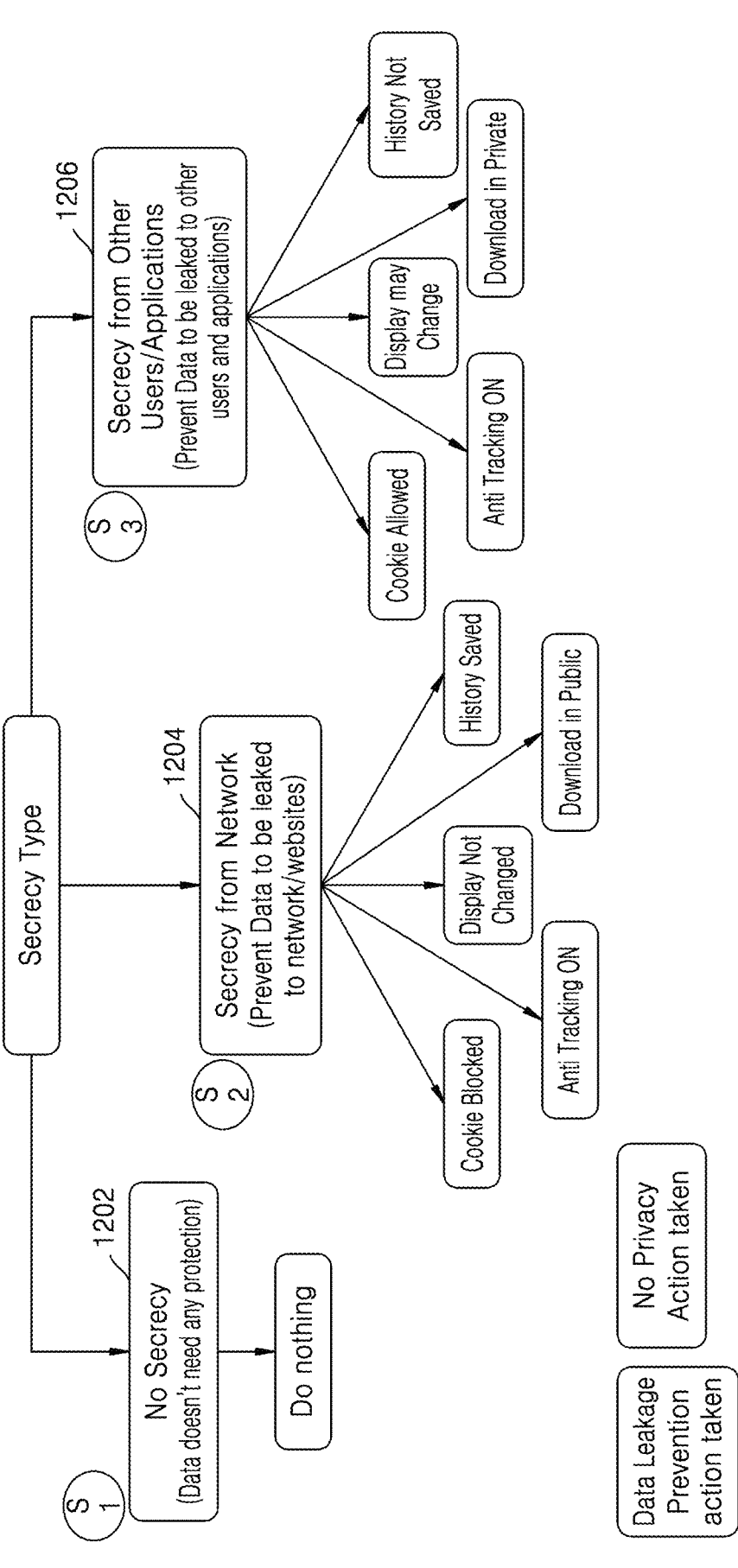
FIG. 12 illustrates a plurality of predefined secrecy types along with exemplary set of secrecy settings applied on an electronic device, according to an embodiment of the disclosure.

FIG. 12 also illustrates a plurality of predefined secrecy types along with set of secrecy settings applied on an electronic device, according to an embodiment of the disclosure.

Referring to FIG. 12, as illustrated, the predefined secrecy types may include at least three predefined secrecy types comprising S1 1202 associated with no secrecy or normal mode, S2 1204 associated with secrecy from network, and S3 1206 associated with secrecy from other users/applications. While applying S1 1202, no special secrecy settings are applied and the user device may continue to operate normally. Further, while applying S2 1204 and S3 1206, a plurality of settings related to cookies, tracking, display, download, and history are applied at the user device. These have been previously explained in detail in conjunction with FIG. 5. The S2 1204 secrecy type application prevents data to be leaked to network or websites. Further, the application of S3 1206 secrecy type prevents data to be leaked to other users and/or applications installed at the user device.

Figure 13:
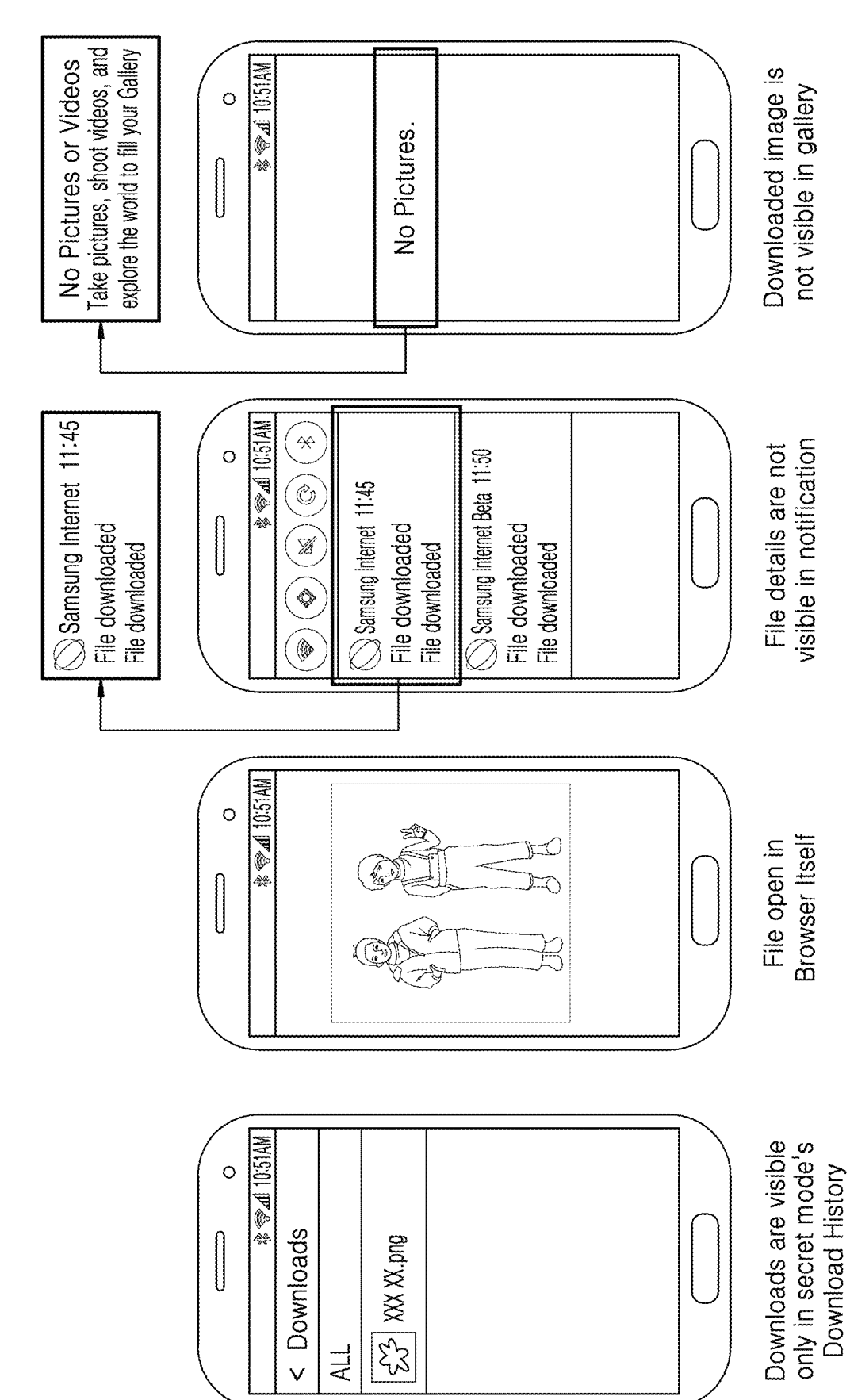
FIG. 13 illustrates a use case of automated predefined secrecy type S3 invocation for a download manager of an electronic device, according to an embodiment of the disclosure.

FIG. 13 illustrates a use case of automated predefined secrecy type S3 invocation for a download manager of an electronic device, according to an embodiment of the disclosure.

As discussed above, once the secrecy type S3 is invoked at the user device, it requires managing downloads privately to safeguard data from other users and/or applications. In an embodiment, once the S3 secrecy type is invoked on the user device, the downloads performed by the user on his/her device may be visible only in a secret download history. Further, the downloaded file may only open in browser itself. Additionally, the details of downloaded files may not be visible in notification(s). Also, a downloaded image may not be visible in media viewing applications (e.g., gallery).

Figure 14A:
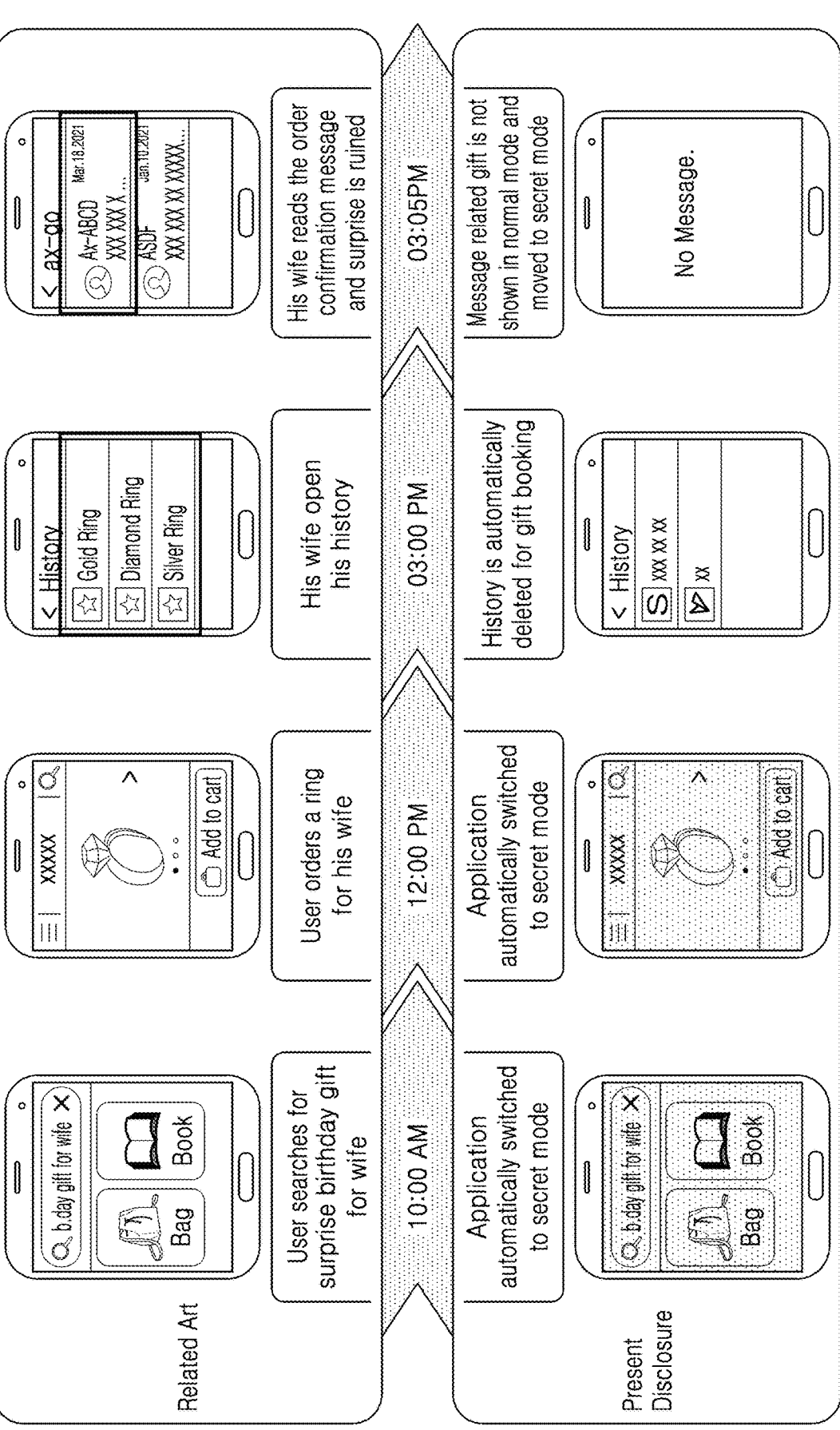

FIGS. 14A and 14B illustrate a use case scenario for a user who is trying to buy a surprise gift for his wife, while keeping it as a surprise, according to various embodiments of the disclosure.

Referring to FIG. 14A, in prior art, if a user searches and orders for a surprise birthday gift for his wife (e.g., a ring), his wife may open history of the user device and may read the order confirmation messages. Hence, the surprise gift would be ruined. As proposed in the disclosure, based on the user activity data and the contextual information (e.g., calendar event or conversation), the system switches automatically to a secret mode S3. Accordingly, the history would be automatically deleted for gift booking. Additionally, the messages (e.g., emails, SMS, notifications, etc.)

related to gift are not shown in normal mode and are moved to secret mode, which is not visible to another user (e.g., his wife).

FIG. 14B illustrates working of each module while determining and applying predefined secrecy type based on user activity, contextual information from other applications, and historical behavior, according to an embodiment of the disclosure.

Referring to FIG. 14B, as illustrated, the current user activity may include search related to "anniversary gift," which may be categorized by the user secrecy behavior categorizer module 510 to determine a category of user action, such as shopping. The category secrecy analyzer module 512 may categorize the shopping in a normal mode, since the user performs such searches from time to time.

Further, the data pre-processor module 514 may receive/extract user contextual information, e.g., data bytes of internet browser, current location, event, conversation, etc. For example, a data byte of a chat/conversation may include "Hey I want to give a surprise gift to my wife any suggestion." Further, data bytes of calendar application event may include "Wife's Birthday on 29$^{th}$." Based on the analysis, the action secrecy analyzer module 516 may be configured to determine secret mode as "YES," while the secrecy type decider module 518 may be configured to determined one of the predefined secrecy types, such as S3 to protect the data from user others, such as his wife. The secrecy settings applier module 506 may be configured to apply one or more settings associated with S3 secrecy type, which may trigger not saving history, and/or messages related to order being hidden at the user device.

Figure 15A:
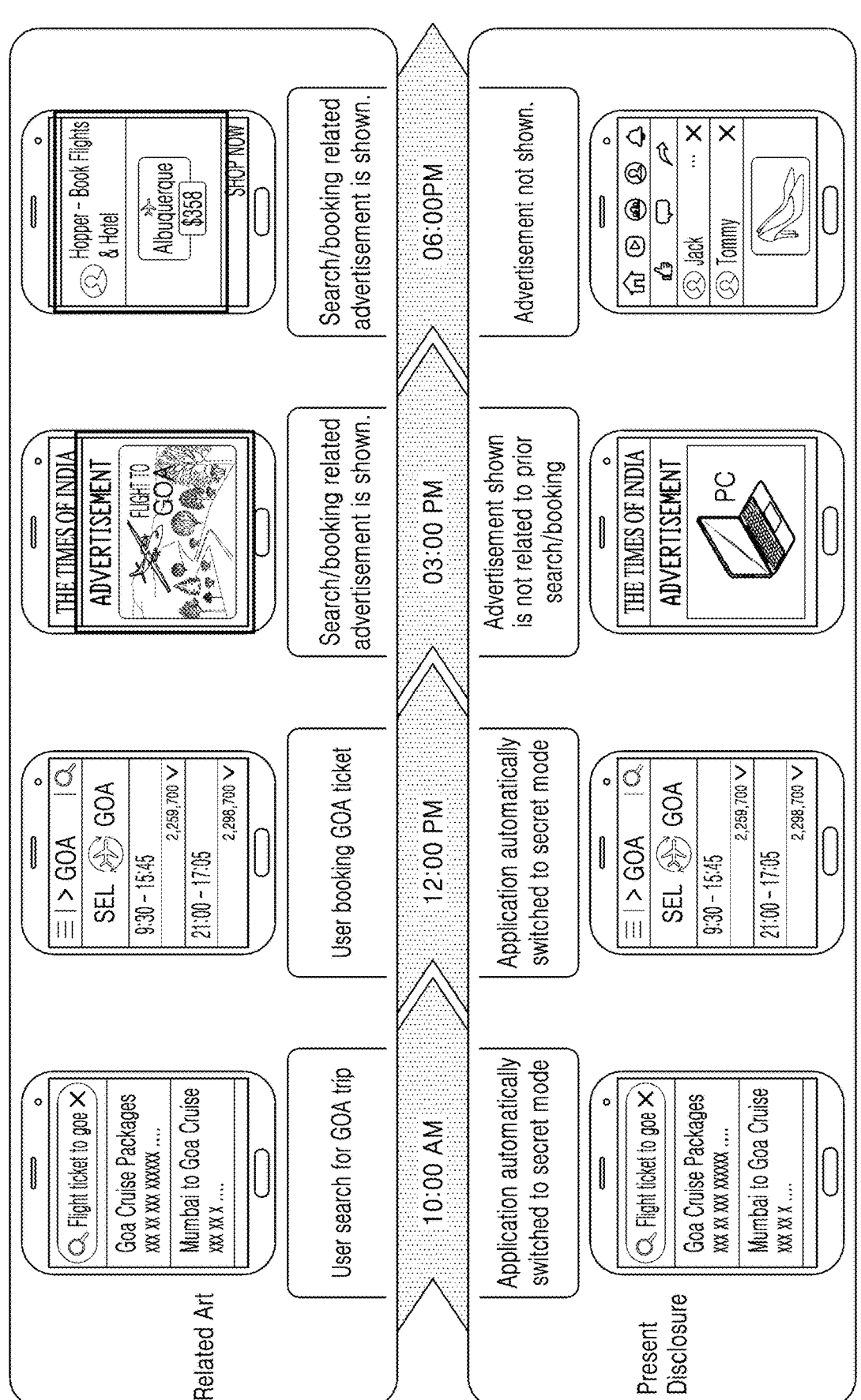
FIGS. 15A and 15B illustrate a use case scenario for a user who went to a party last night and now he is downloading the party photos, according to various embodiments of the disclosure.
Figure 15B:
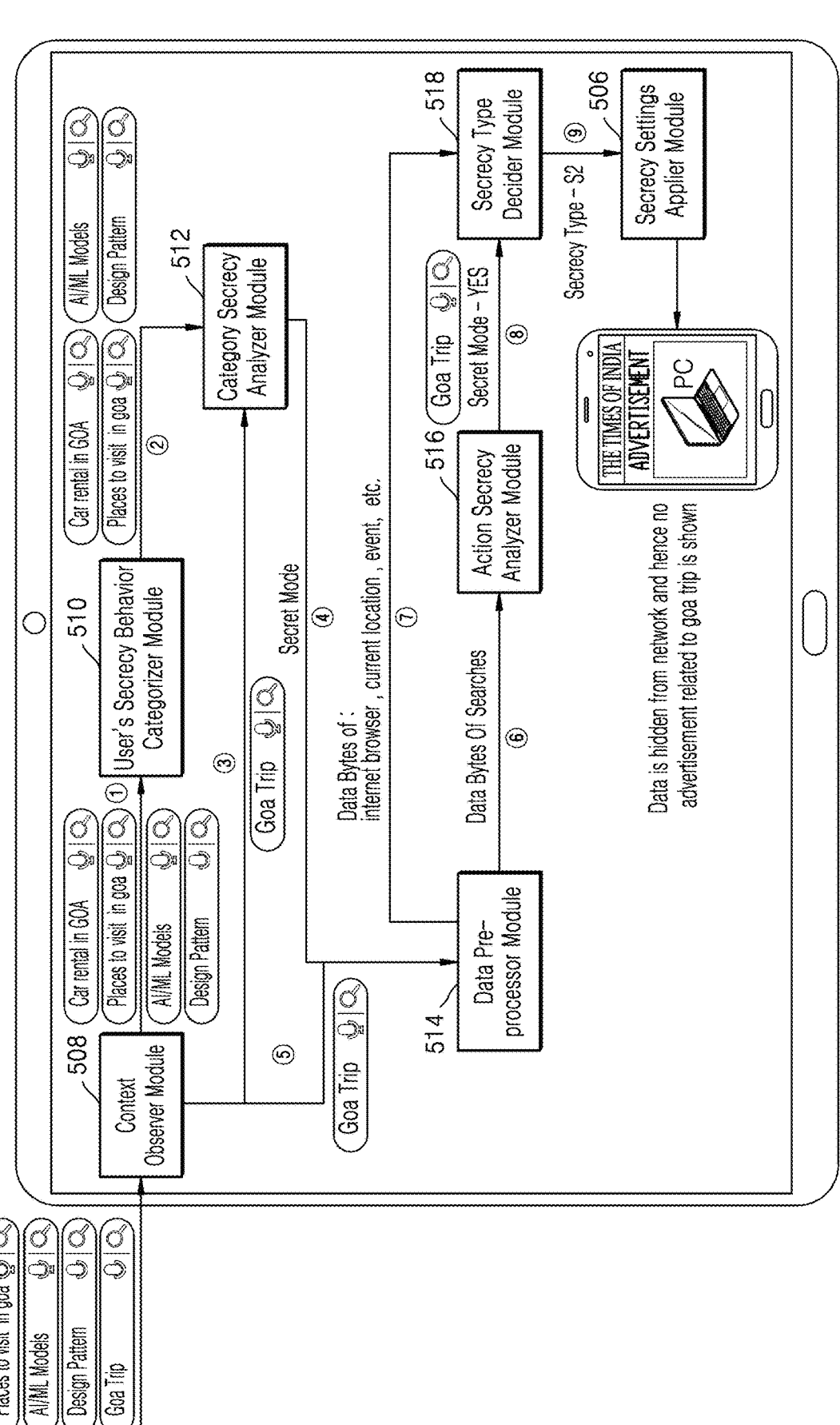

FIGS. 15A and 15B illustrate a use case scenario for a user who is trying to search for tickets to Goa and does not want to let network know about his activities, according to various embodiments of the disclosure.

Referring to FIG. 15A, in related arts, when a user searches for a trip, generally, his cookies are tracked and booking related advertisements start popping-up at the user device. However, the disclosure automatically identifies that the user is searching for a trip, and invokes a secrecy mode S2 to avoid leakage of data to network. Hence, no unnecessary advertisements are shown to the user related to the trip.

FIG. 15B illustrates working of each module while determining and applying predefined secrecy type based on user activity, contextual information from other applications, and historical behavior in the current example, according to an embodiment of the disclosure.

Referring to FIG. 15B, as illustrated, the current user activity may include search related to "car rental in Goa" and/or "places to visit in Goa," which may be categorized by the user secrecy behavior categorizer module 510 to determine a category of user action, such as vacation/trip or Goa trip. The category secrecy analyzer module 512 may categorize the trip in a secret mode, based on past behavior of the user associated with deleting search history/messages to avoid spams.

Further, the data pre-processor module 514 may receive/extract user contextual information, e.g., data bytes of internet browser, current location, event, conversation, etc. For example, a data byte of a chat/conversation may include "Goa trip." Based on the analysis, the action secrecy analyzer module 516 may be configured to determine secret mode as "YES," while the secrecy type decider module 518 may be configured to determined one of the predefined secrecy types, such as S2 to protect the data from network or websites. The secrecy settings applier module 506 may be configured to apply one or more settings associated with S2 secrecy type, which may trigger hiding data from network and/or websites, and hence, no advertisements related to Goa trip are shown to the user at the user device.

Figure 16B:
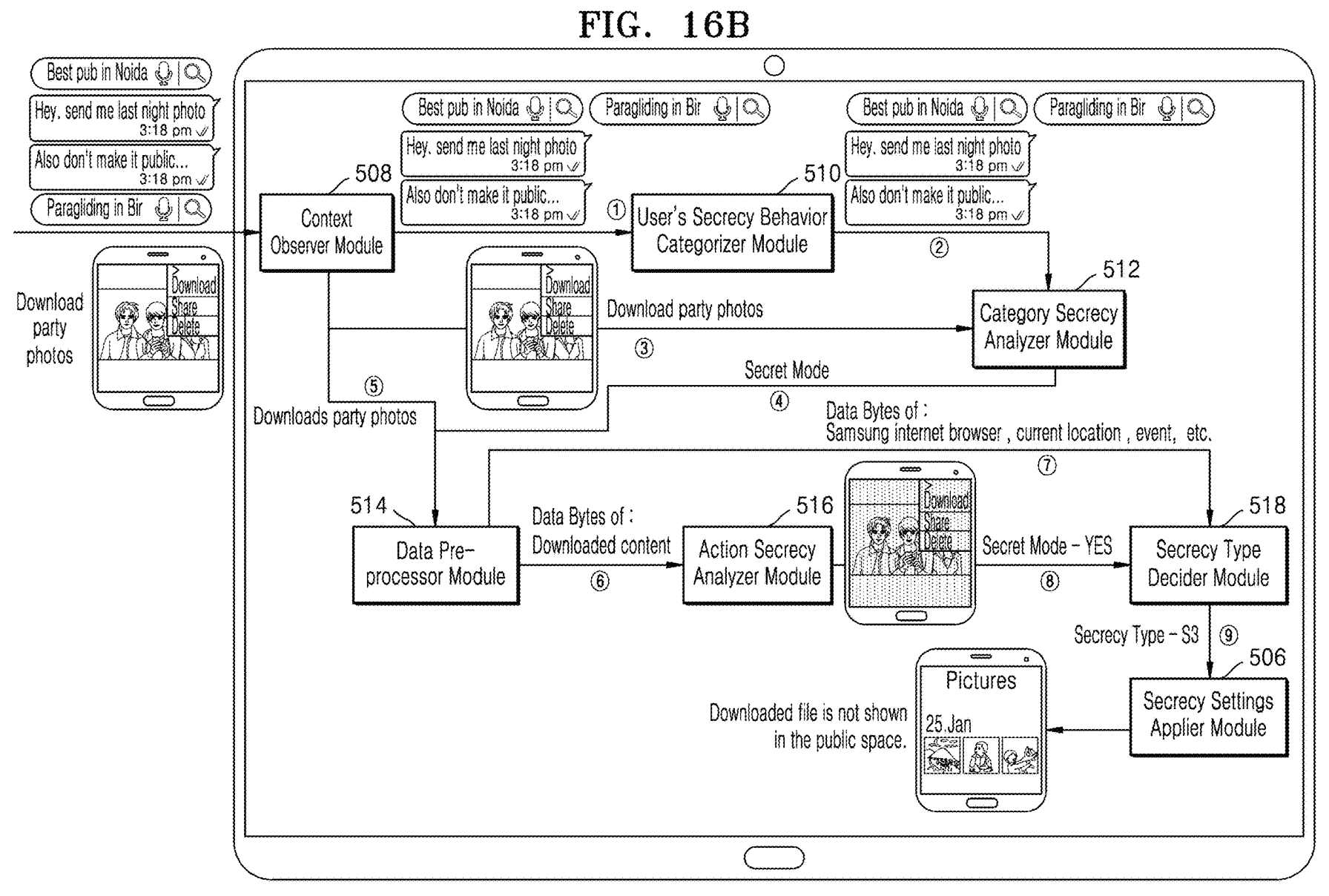

FIGS. 16A and 16B illustrate a use case scenario for a user who went to a party last night and now he is downloading the party photos, according to various embodiments of the disclosure.

Referring to FIG. 16A, as depicted, in related art, if the user received some party photos from a friend, the photos shall be visible inside the gallery or any other photo application installed at the user device. However, based on automatic application of predefined secrecy type S3, the images shall not be visible in any photo application and may only be visible in browser.

FIG. 16B illustrates working of each module while determining and applying predefined secrecy type based on user activity, contextual information from other applications, and historical behavior in the current example according to an embodiment of the disclosure.

Referring to FIG. 16B, as illustrated, the current user activity may include search related to "best pub in Noida" and "please send me photos of last night and don't make it public" over an application, which may be categorized by the user secrecy behavior categorizer module 510 to determine a category of user action, such as party photos. The category secrecy analyzer module 512 may categorize the trip in a secret mode, based on past behavior of the user associated with deleting such pictures/messages to protect his privacy.

Further, the data pre-processor module 514 may receive/extract user contextual information, e.g., data bytes of internet browser, current location, event, conversation, etc. Based on the analysis, the action secrecy analyzer module 516 may be configured to determine secret mode as "YES," while the secrecy type decider module 518 may be configured to determined one of the predefined secrecy types, such as S3 to protect the data from other users and/applications from using/seeing the photos. The secrecy settings applier module 506 may be configured to apply one or more settings associated with S3 secrecy type, which may trigger not saving downloaded file in a public space of the user device.

Figure 17:
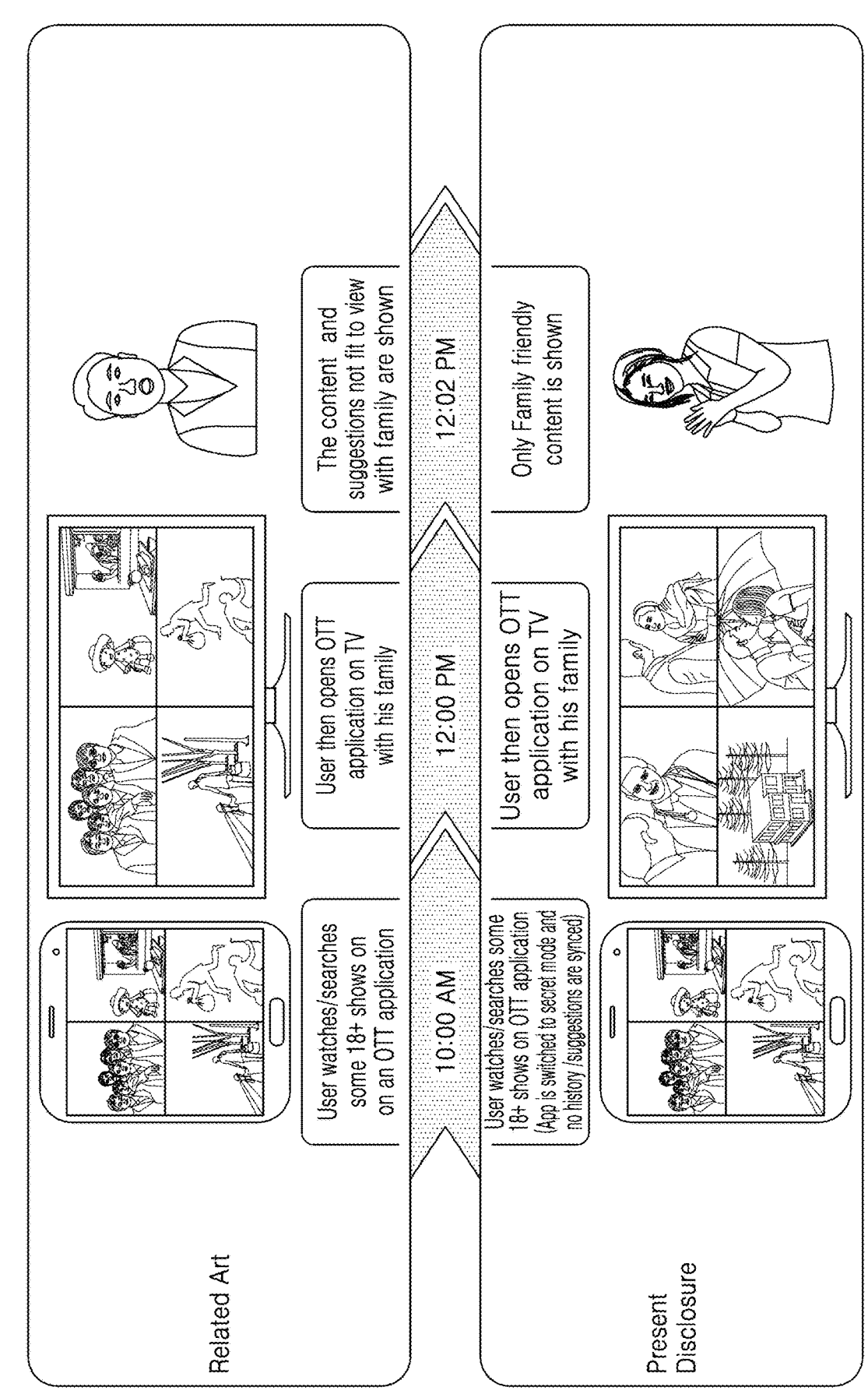
FIG. 17 illustrates a use case scenario for a user who searched for adult content on an over-the-top (OTT) application in his personal phone and then he opened the OTT application on TV, according to an embodiment of the disclosure.

FIG. 17 illustrates a use case scenario for a user who searched for adult content on an OTT application in his personal phone and then he opened the OTT application on TV, according to an embodiment of the disclosure.

Referring to FIG. 17, as illustrated, in related art, if user watches/searches some 18+ shows on an OTT application and subsequently, if the user then opens the OTT application on TV with his family, the OTT application may show the content and suggestions not fit to view with family.

However, the disclosure enables switching the OTT application content to a mode, wherein any explicit content (e.g., adult content) is hidden based on the device where the user is currently browsing the OTT application. As depicted, while the user is watching/searching some 18+ shows on OTT application on his tablet/mobile device, however, when the user opens the OTT application on TV with his family, only family friendly content is shown. Thus, the disclosure may be integrated with other third party applications for protecting user privacy.

Figure 18:
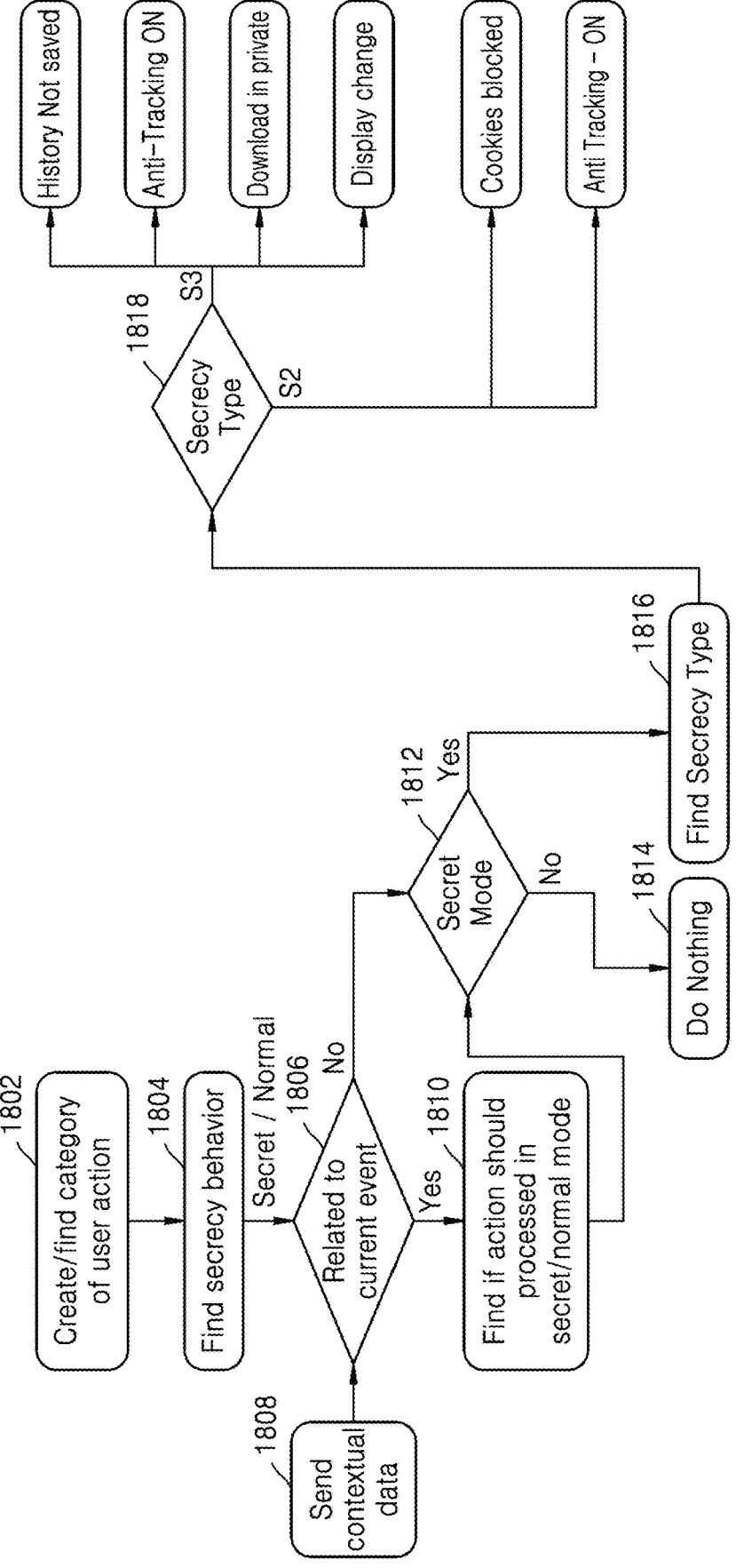
FIG. 18 illustrates a process flow depicting a method for secret modes invocation on a device, according to an embodiment of the disclosure.

FIG. 18 illustrates a process flow depicting a method for secret modes invocation on a device, according to an embodiment of the disclosure.

Referring to FIG. 18, a method 1800 includes, at operation 1802, creating/finding category of user action. At operation 1804, the method 1800 includes find secrecy behavior of the user. The secrecy behavior may include either secret or normal. At operation 1806, the method 1800 includes determining whether the secrecy behavior is related to a current event based on contextual data/information received at operation 1808. The determination may include analyzing contextual data, which is received from a module, as discussed previously. Based on a determination that the secrecy behavior is related to a current event, it may be determined if the action should be processed in secret/normal mode at operation 1810. If not, then it may be further determined if the secret mode may be invoked at operation 1812. If no secret mode needs to be invoked, then the method proceeds to end and without invoking any change at operation 1814. At operation 1816, the method 1800 includes determining the secrecy type. The determined secrecy type at operation 1818 may include S2 and S3 as discussed previously. The S2 may include blocking cookies and switching ON the anti-tracking. The S3 may include not saving history, switching ON anti-tracking, downloading in private mode, and changing the display.

Further, the disclosure facilitates in intelligently triggering a secret mode at the user device based on learnings from user actions and historical data. Thus, automatically preventing the leakage of user's data and enhancing safe usage. Additionally, the disclosure provides for various technical advancements over the conventional prior arts as discussed below.

Data leakage to the network—The normal mode is switched to secret mode intelligently. Thus, no data is leaked indirectly and helps to prevent spam advertisements related to the user's actions.

Leakage to other users—The normal mode is switched to secret mode. Users' actions are not stored in any way (like browsing history, cookies, etc.)

Data safeguarding from other applications—Content downloaded in secret mode will not be shown in any other application (can only be seen in secret mode).

Further, at least by virtue of aforesaid, the disclosure provides for additional technical advancements such as:

a) New intelligent secret mode—In the existing secret mode, there is no intelligence and no security. The disclosure adds the intelligence in deciding if the user action should be processed in secret mode. Even if the action is in secret mode, the disclosure determines why user wants to go to secret mode and thus applies only selective secret mode settings.

b) No extra hardware required and minimal processing—This disclosure doesn't require extra hardware or any that much processing power or time.

c) Enhanced user experience and privacy—This disclosure will help user to hide themselves from the network and other users and applications. Thus, improving the device usage experience for the user.

The ML model is highly intelligent that keeps learning in order to find the secrecy behavior of the actions based on user's preferences. Further, the disclosure facilitates keeping the parts of the files at secure location. It will automatically move the user to secret mode, thus reducing the issues related to privacy of users.

While specific language has been used to describe the present subject matter, any limitations arising on account thereto, are not intended. As would be apparent to a person in the art, various working modifications may be made to the method in order to implement the inventive concept as taught herein. The drawings and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment.

According to an embodiment of the disclosure, a method of applying secrecy settings on a user device is provided. The method may include monitoring user activity data based on usage of one or more applications of the user device. The method may include determining, via a neural network model, whether the user is exhibiting a secretive behavior based on the user activity data and historical behavior of the user. The method may include extracting contextual information from other applications, wherein the contextual information is associated with the user activity data. The method may include determining whether the contextual information is related to the user activity data. The method may include processing, based on the secretive behavior, the contextual information to provide at least one data stream and at least one attribute associated with the contextual information responsive to a determination that the contextual information is related to the user activity data. The method may include determining a predefined secrecy type, of a plurality of predefined secrecy types, based on the analysis of the at least one data stream and the at least one attribute in response to a determination that the user activity data should be processed according to one of the plurality of predefined secrecy types. The method may include applying secrecy settings on the user device based on the predefined secrecy type.

According to an embodiment of the disclosure, the secretive behavior may include one of a normal behavior and a secret behavior.

According to an embodiment of the disclosure, the method may include clustering the user activity data into at least one predefined category. The method may include determining whether the user activity data of one of the at least one predefined category is to be processed according to one of the plurality of predefined secrecy types based on a usage pattern of the user device. The plurality of predefined secrecy types corresponds to the secretive behavior.

According to an embodiment of the disclosure, the user activity data may include at least one of application activity data, user actions, usage pattern of the user device, demographics information, call history, and messages.

According to an embodiment of the disclosure, at least one attribute associated with the contextual information may include deletion history and application activity.

According to an embodiment of the disclosure, the contextual information may include at least one of conversations, application data, application activities, application usage, and search patterns at the user device. The at least one data stream may include at least one of audio data stream, image data stream, and video data stream captured on the user device.

According to an embodiment of the disclosure, the method may include analyzing the at least one data stream and the at least one attribute to determine whether the user activity data should be processed according to one of a plurality of predefined secrecy types.

According to an embodiment of the disclosure, analyzing the at least one data stream and the at least one attribute may include analyzing, by one or more neural network models, the at least one data stream and the at least one attribute to determine whether the stream is one of public or private, analyzing the at least one data stream and the at least one attribute may include determining whether the user activity data should be processed according to one of the plurality of predefined secrecy types in response to the determination whether the at least one data stream is one of public or private.

According to an embodiment of the disclosure, applying the secrecy settings based on the predefined secrecy type may include modifying at least one of display, tracking, cookie, download, and history settings at the user device.

According to an embodiment of the disclosure, applying the secrecy settings based on the predefined secrecy type may include at least one of: modifying current user interface content at the user device; modifying a tracking status of the one or more applications at the user device; modifying the cookie status of the one or more applications at the user device; modifying the downloading status of the one or more applications at the user device; and modifying the history storage settings of the one or more applications at the user device.

According to an embodiment of the disclosure, the method may include monitoring the user activity data during a specific time period based on the one or more applications of the user device. The monitoring the user activity data may include tracking a sequence of events in the one or more applications of the user device. The monitoring the user activity data may include clustering user activity data into at least one category. The monitoring the user activity data may include determining whether the user activity data of one of the at least one category is processed according to one of the plurality of predefined secrecy types based on usage pattern of the user device. The monitoring the user activity data may include training the neural network model with the user activity data, the at least one category, and the plurality of predefined secrecy types.

According to an embodiment of the disclosure, the method may include determining the predefined secrecy type, of the plurality of predefined secrecy types, based on the secretive behavior in response to a determination that the contextual information is not related to the user activity data.

According to an embodiment of the disclosure, the at least one data stream and the at least one attribute are indicative of at least one of current user actions and data from the other applications.

According to an embodiment of the disclosure, an electronic device for applying secrecy settings on a user device is provided. The electronic device may include memory and at least one processor. The processor may be configured to monitor user activity data based on usage of one or more applications of the user device. The processor may be configured to determine, via a neural network model, whether the user is exhibiting a secretive behavior based on the user activity data and historical behavior of the user. The processor may be configured to extract contextual information from other applications, wherein the contextual information is associated with the user activity data the processor may be configured to determine whether the contextual information is related to the user activity data. The processor may be configured to process, based on the secretive behavior, the contextual information to provide at least one data stream and at least one attribute associated with the contextual information responsive to a determination that the contextual information is related to the user activity data. The processor may be configured to determine a predefined secrecy type, of a plurality of predefined secrecy types, based on the analysis of the at least one data stream and the at least one attribute in response to a determination that the user activity data should be processed according to one of the plurality of predefined secrecy types. The processor may be configured to apply secrecy settings on the user device based on the predefined secrecy type.

According to an embodiment of the disclosure, the processor may be configured to cluster the user activity data into at least one predefined category. The processor may be configured to determine whether the user activity data of one of the at least one predefined category is to be processed according to one of the plurality of predefined secrecy types based on a usage pattern of the user device, wherein the plurality of predefined secrecy types corresponds to the secretive behavior.

According to an embodiment of the disclosure, the processor may be configured to analyze the at least one data stream and the at least one attribute to determine whether the user activity data should be processed according to one of a plurality of predefined secrecy types.

According to an embodiment of the disclosure, the processor may be configured to at least one of: modify current user interface content at the user device, modify a tracking status of the one or more applications at the user device, modify the cookie status of the one or more applications at the user device, modify the downloading status of the one or more applications at the user device, and modify the history storage settings of the one or more applications at the user device.

According to an embodiment of the disclosure, the processor may be configured to monitor the user activity data during a specific time period based on the one or more applications of the user device. The monitoring the user activity data may include tracking a sequence of events in the one or more applications of the user device. The processor may be configured to cluster user activity data into at least one category. The processor may be configured to determine whether the user activity data of one of the at least one category is processed according to one of the plurality of predefined secrecy types based on usage pattern of the user device. The processor may be configured to train the neural network model with the user activity data, the at least one category, and the plurality of predefined secrecy types.

According to an embodiment of the disclosure, the processor may be configured to determine the predefined secrecy type, of the plurality of predefined secrecy types, based on the secretive behavior in response to a determination that the contextual information is not related to the user activity data.

It will be appreciated that various embodiments of the disclosure according to the claims and description in the specification can be realized in the form of hardware, software or a combination of hardware and software.

Any such software may be stored in non-transitory computer readable storage media. The non-transitory computer readable storage media store one or more computer programs (software modules), the one or more computer programs include computer-executable instructions that, when executed by one or more processors of an electronic device, cause the electronic device to perform a method of the disclosure.

Any such software may be stored in the form of volatile or non-volatile storage such as, for example, a storage device like read only memory (ROM), whether erasable or rewritable or not, or in the form of memory such as, for example, random access memory (RAM), memory chips, device or integrated circuits or on an optically or magnetically readable medium such as, for example, a compact disk (CD), digital versatile disc (DVD), magnetic disk or magnetic tape or the like. It will be appreciated that the storage devices and storage media are various embodiments of non-transitory machine-readable storage that are suitable for storing a computer program or computer programs comprising instructions that, when executed, implement various embodiments of the disclosure. Accordingly, various embodiments provide a program comprising code for implementing apparatus or a method as claimed in any one of the claims of this specification and a non-transitory machine-readable storage storing such a program.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method of applying secrecy settings on a user device, the method comprising:
   monitoring, by the user device, user activity data based on usage of one or more applications of the user device;
   determining, by the user device via a neural network model, whether a user is exhibiting a secretive behavior based on the user activity data and historical behavior of the user;
   extracting, by the user device, contextual information from other applications, wherein the contextual information is associated with the user activity data;
   determining, by the user device, whether the contextual information is related to the user activity data;
   in response to determining that the contextual information is related to the user activity data, processing, by the user device based on the secretive behavior, the contextual information to provide at least one data stream and at least one attribute associated with the contextual information;
   in response to determining to process the user activity data according to one of a plurality of predefined secrecy types, determining, by the user device, a predefined secrecy type from among the plurality of predefined secrecy types based on an analysis of the at least one data stream and the at least one attribute; and
   applying, by the user device, secrecy settings on the user device based on the predefined secrecy type,
   wherein the method further comprises:
     clustering, by the user device, the user activity data into at least one predefined category; and
     determining, by the user device, whether the user activity data of one of the at least one predefined category is to be processed according to one of the plurality of predefined secrecy types based on a usage pattern of the user device, and
   wherein the plurality of predefined secrecy types corresponds to the secretive behavior.

2. The method of claim 1, wherein the secretive behavior comprises one of a normal behavior or a secret behavior.

3. The method of claim 1, wherein the user activity data comprises at least one of application activity data, user actions, the usage pattern of the user device, demographics information, a call history, or messages.

4. The method of claim 1, wherein the at least one attribute associated with the contextual information comprises deletion history and application activity.

5. The method of claim 1, wherein the contextual information comprises at least one of conversations, application data, application activities, application usage, or search patterns at the user device, and wherein the at least one data stream comprises at least one of an audio data stream, an image data stream, or a video data stream captured on the user device.

6. The method of claim 1, further comprising:

analyzing, by the user device, the at least one data stream and the at least one attribute to determine whether the user activity data should be processed according to one of the plurality of predefined secrecy types.

7. The method of claim 6, wherein the analyzing of the at least one data stream and the at least one attribute comprises:

analyzing, by the user device via one or more neural network models, the at least one data stream and the at least one attribute to determine whether the at least one data stream is one of public or private; and based on a result of determining whether the at least one data stream is one of public or private, determining whether the user activity data should be processed according to one of the plurality of predefined secrecy types.

8. The method of claim 1, wherein the applying of the secrecy settings based on the predefined secrecy type comprises modifying at least one of display settings, tracking settings, cookie settings, download settings, or history settings at the user device.

9. The method of claim 1, wherein the applying of the secrecy settings based on the predefined secrecy type comprises at least one of:

modifying, by the user device, current user interface content at the user device;

modifying, by the user device, a tracking status of the one or more applications of the user device;

modifying, by the user device, a cookie status of the one or more applications of the user device;

modifying, by the user device, a downloading status of the one or more applications of the user device; or modifying, by the user device, history storage settings of the one or more applications of the user device.

10. The method of claim 1, further comprising:

monitoring, by the user device, the user activity data during a specific time period based on the one or more applications of the user device, wherein the monitoring of the user activity data comprises tracking a sequence of events in the one or more applications of the user device;

clustering, by the user device, the user activity data into at least one category;

determining, by the user device, whether the user activity data of one of the at least one category is processed according to one of the plurality of predefined secrecy types based on the usage pattern of the user device; and training, by the user device, the neural network model with the user activity data, the at least one category, and the plurality of predefined secrecy types.

11. The method of claim 1, further comprising:

in response to determining that the contextual information is not related to the user activity data, determining, by the user device, the predefined secrecy type among the plurality of predefined secrecy types based on the secretive behavior.

12. The method of claim 1, wherein the at least one data stream and the at least one attribute are indicative of at least one of current user actions or data from the other applications.

13. An electronic device for applying secrecy settings, the electronic device comprising:

memory storing one or more computer programs; and one or more processors communicatively coupled to the memory;

wherein the one or more computer programs include computer-executable instructions that, when executed by the one or more processors, cause the electronic device to:

monitor user activity data based on usage of one or more applications of the electronic device, determine, via a neural network model, whether a user is exhibiting a secretive behavior based on the user activity data and historical behavior of the user, extract contextual information from other applications, wherein the contextual information is associated with the user activity data, determine whether the contextual information is related to the user activity data, in response to determining that the contextual information is related to the user activity data, process, based on the secretive behavior, the contextual information to provide at least one data stream and at least one attribute associated with the contextual information, in response to determining to process the user activity data according to one of a plurality of predefined secrecy types, determine a predefined secrecy type from among the plurality of predefined secrecy types based on an analysis of the at least one data stream and the at least one attribute, and apply secrecy settings on the electronic device based on the predefined secrecy type, wherein the one or more computer programs further include computer-executable instructions that, when executed by the one or more processors, cause the electronic device to:

cluster the user activity data into at least one predefined category, and determine whether the user activity data of one of the at least one predefined category is to be processed according to one of the plurality of predefined secrecy types based on a usage pattern of the electronic device, and wherein the plurality of predefined secrecy types corresponds to the secretive behavior.

14. The electronic device of claim 13, wherein the one or more computer programs further include computer-executable instructions that, when executed by the one or more processors, cause the electronic device to:

create the usage pattern for the electronic device corresponding to received sequence of actions using frequent pattern mining algorithms, and wherein the frequent patten mining algorithms include a frequent pattern growth (FP-growth) scalable technique in which the FP-growth is provided as an input to K-pattern clustering and similar patterns are grouped by using frequent activity patterns' mining to cluster the user activity data into one or more predefined categories.

15. The electronic device of claim 13,
wherein the one or more computer programs further include computer-executable instructions that, when executed by the one or more processors, cause the electronic device to:
    based on the predefined secrecy type being a second predefined secrecy type, perform downloads in a public space of the electronic device, and
    based on the predefined secrecy type being a third predefined secrecy type, perform the downloads in a private space of the electronic device, and
  wherein files downloaded in the private space are opened/viewed only in a particular application and only by an authenticated user and all other applications are blocked from accessing the files downloaded in the private space.

16. The electronic device of claim 13, wherein the plurality of predefined secrecy types include at least three predefined secrecy types comprising a first predefined secrecy type associated with no secrecy or normal mode, a second predefined secrecy type associated with secrecy from network, and a third predefined secrecy type associated with secrecy from other users/applications.

17. One or more non-transitory computer-readable storage media storing one or more computer programs including computer-executable instructions that, when executed by one or more processors of a user device, cause the user device to perform operations, the operations comprising:
  monitoring, by the user device, user activity data based on usage of one or more applications of the user device;

determining, by the user device via a neural network model, whether a user is exhibiting a secretive behavior based on the user activity data and historical behavior of the user;
  extracting, by the user device, contextual information from other applications, wherein the contextual information is associated with the user activity data;
  determining, by the user device, whether the contextual information is related to the user activity data;
  in response to determining that the contextual information is related to the user activity data, processing, by the user device based on the secretive behavior, the contextual information to provide at least one data stream and at least one attribute associated with the contextual information;
  in response to determining to process the user activity data according to one of a plurality of predefined secrecy types, determining, by the user device, a predefined secrecy type from among the plurality of predefined secrecy types based on an analysis of the at least one data stream and the at least one attribute; and
  applying, by the user device, secrecy settings on the user device based on the predefined secrecy type,
  wherein the operations further comprise:
    clustering, by the user device, the user activity data into at least one predefined category; and
    determining, by the user device, whether the user activity data of one of the at least one predefined category is to be processed according to one of the plurality of predefined secrecy types based on a usage pattern of the user device, and
  wherein the plurality of predefined secrecy types corresponds to the secretive behavior.

\* \* \* \* \*